United States Patent
Takatori et al.

(10) Patent No.: US 7,518,582 B2
(45) Date of Patent: *Apr. 14, 2009

(54) LIQUID CRYSTAL PANEL, LIQUID CRYSTAL DISPLAY DEVICE, AND ELECTRONIC EQUIPMENT

(75) Inventors: Kenichi Takatori, Tokyo (JP); Kossikhina A. Svetlana, Tokyo (JP)

(73) Assignee: Nec Corporation, Tokyo (JP)

( * ) Notice: Subject to any disclaimer, the term of this patent is extended or adjusted under 35 U.S.C. 154(b) by 946 days.

This patent is subject to a terminal disclaimer.

(21) Appl. No.: 10/867,676

(22) Filed: Jun. 16, 2004

(65) Prior Publication Data

US 2004/0252272 A1 Dec. 16, 2004

(30) Foreign Application Priority Data

Jun. 16, 2003 (JP) ............... 2003-170896

(51) Int. Cl.
*G09G 3/36* (2006.01)
(52) U.S. Cl. .......................................... 345/87; 345/97
(58) Field of Classification Search .................. 345/87, 345/88, 97, 102; 349/76, 101, 179–181
See application file for complete search history.

(56) References Cited

U.S. PATENT DOCUMENTS

| | | | |
|---|---|---|---|
| 5,837,161 A | 11/1998 | Sekiguchi et al. | |
| 6,133,975 A | 10/2000 | Li et al. | |
| 6,304,254 B1 | 10/2001 | Johnson et al. | |
| 2003/0107693 A1 | 6/2003 | Yamahara | |
| 2005/0140634 A1* | 6/2005 | Takatori | 345/96 |
| 2006/0145978 A1* | 7/2006 | Takatori et al. | 345/87 |

FOREIGN PATENT DOCUMENTS

| | | |
|---|---|---|
| CN | 1131177 | 9/1996 |
| CN | 1204064 | 1/1999 |
| CN | 1400488 | 3/2003 |
| CN | 1412737 | 4/2003 |
| JP | 04-278929 | 10/1992 |
| JP | 04-349430 | 12/1992 |
| JP | 05-040281 | 2/1993 |

(Continued)

OTHER PUBLICATIONS

Chinese Official Action dated Feb. 29, 2008 in Chinese Application No. 200610143925.7.

(Continued)

*Primary Examiner*—Ricardo L Osorio
(74) *Attorney, Agent, or Firm*—Young & Thompson

(57) ABSTRACT

A relation between a twist pitch p of twisted nematic liquid crystal and a thickness d of a liquid crystal layer is set to p/d<8, and polymer stabilization is carried out. In this way, torque to recover from alignment upon application of a voltage to alignment without application of the voltage is increased and response speed of the liquid crystal at decay time is thereby increased. By applying the present technique to a liquid crystal display device which is driven by a reset operation, an overdrive operation or common modulation, high response speed is obtained even when the twisted nematic liquid crystal is used. As a result, the liquid crystal display device can deal with field sequential display mode where higher response speed is required.

23 Claims, 19 Drawing Sheets

FOREIGN PATENT DOCUMENTS

| | | |
|---|---|---|
| JP | 06-067154 | 3/1994 |
| JP | 06-160814 | 6/1994 |
| JP | 06-510384 | 11/1994 |
| JP | 10-090642 | 4/1998 |
| JP | 2000-275642 | 10/2000 |
| JP | 2000-347175 | 12/2000 |
| JP | 2001-506376 | 5/2001 |
| JP | 2002-277853 | 9/2002 |
| JP | 2002-277902 | 9/2002 |
| WO | WO 98/27538 | 6/1998 |

OTHER PUBLICATIONS

Process Base of Liquid Crystal Device, Jun. 30, 2001, pp. 1-4.

* cited by examiner

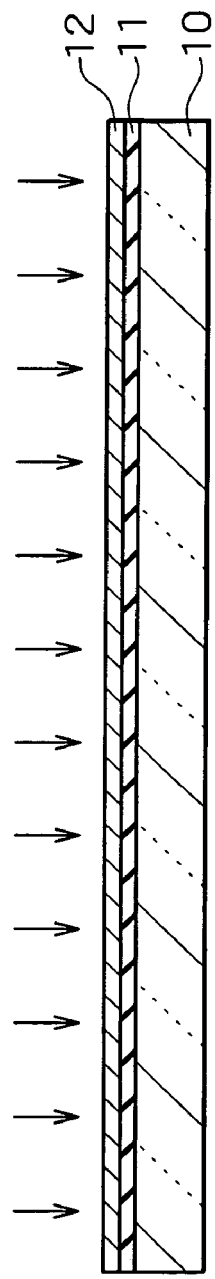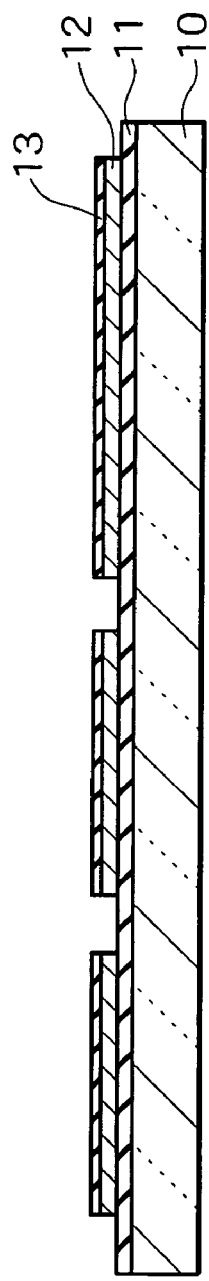

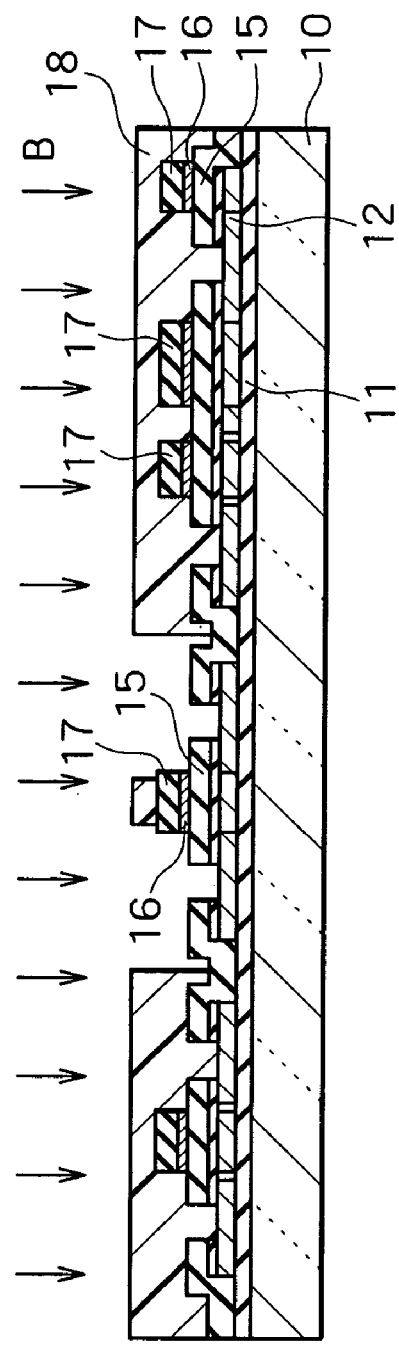
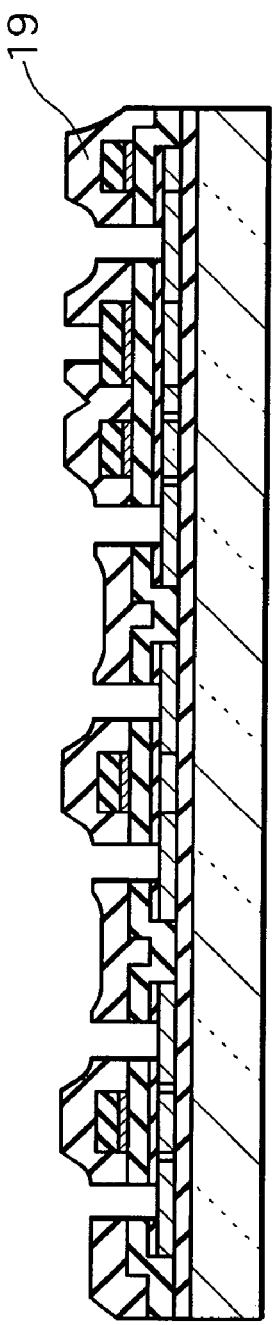

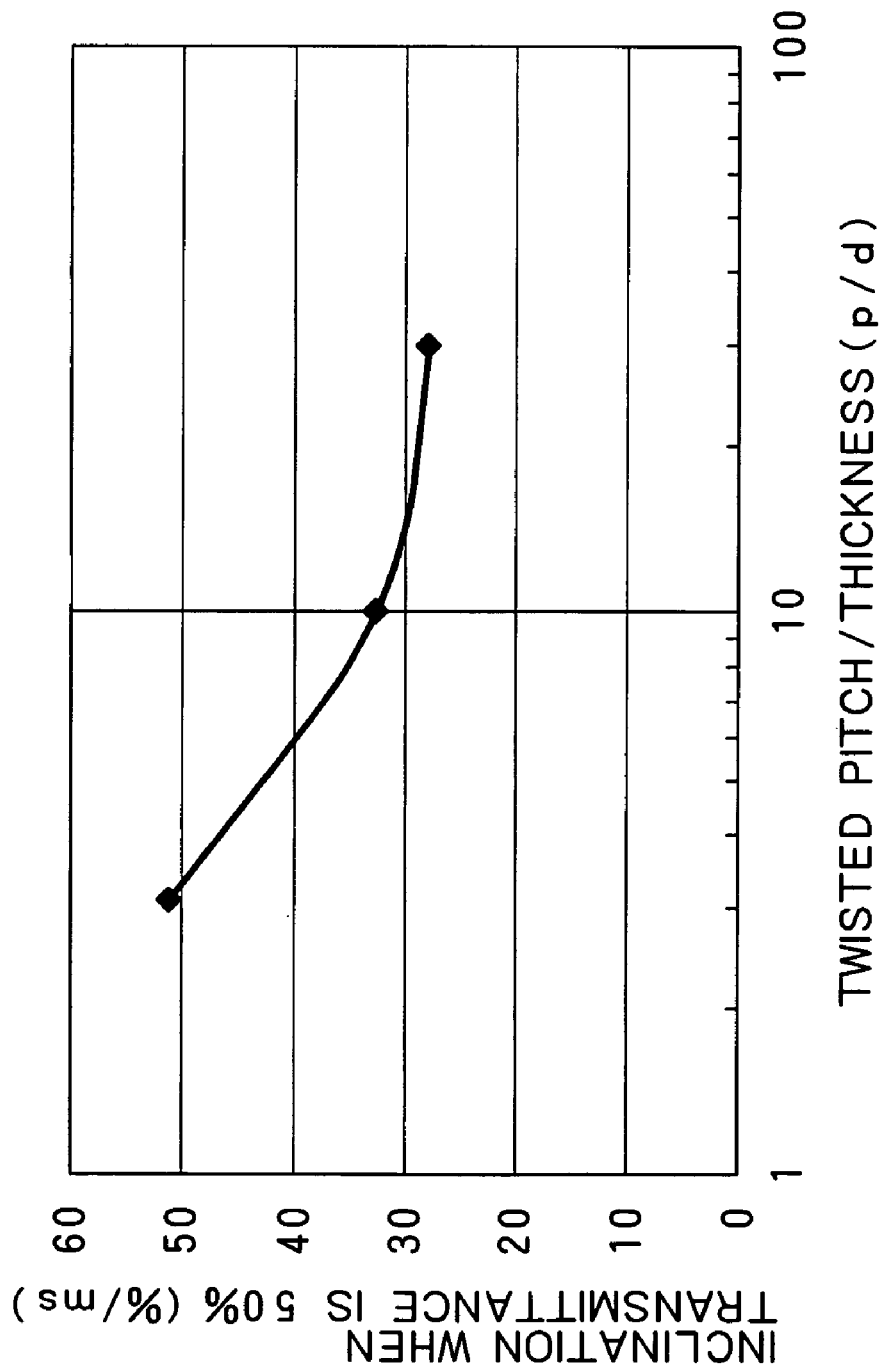

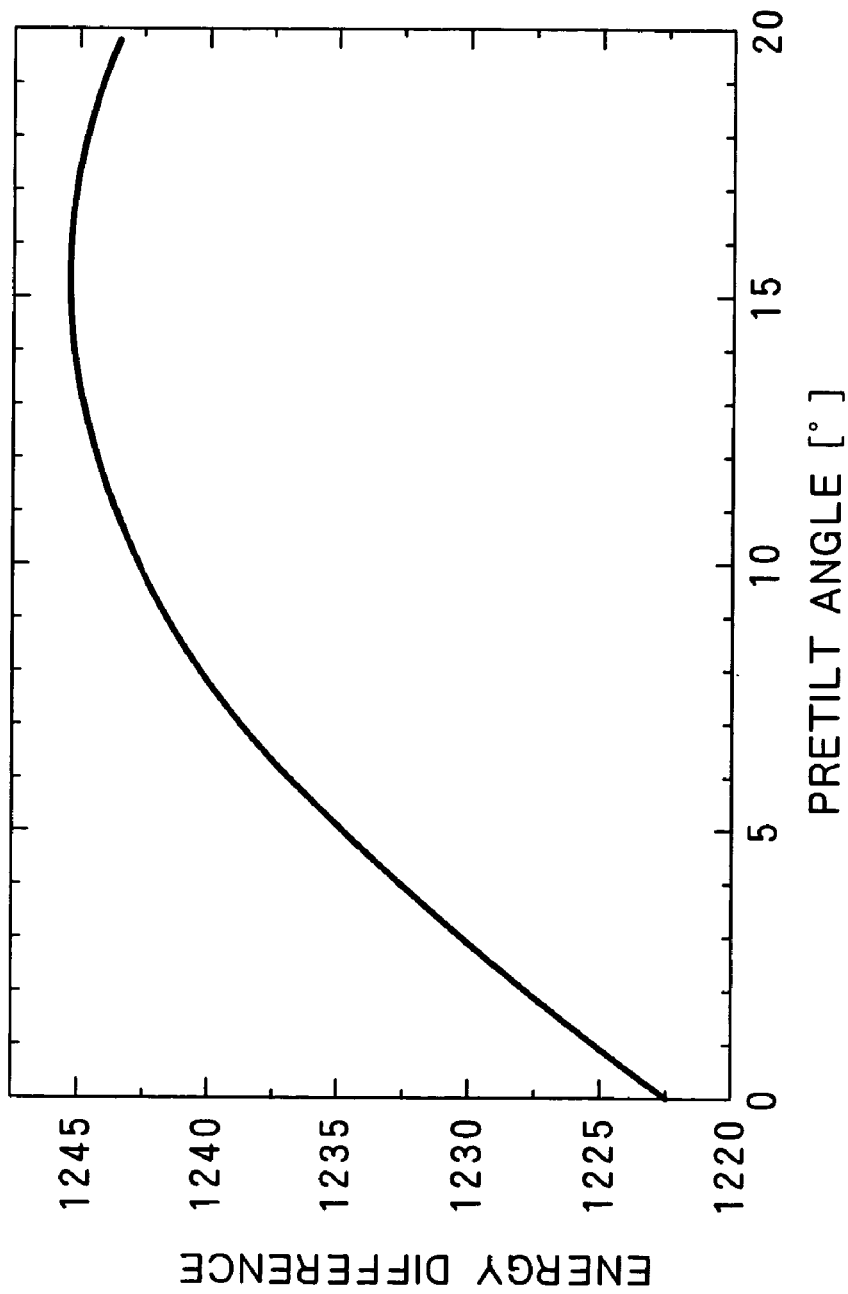

LIQUID CRYSTAL PANEL, LIQUID CRYSTAL DISPLAY DEVICE, AND ELECTRONIC EQUIPMENT

BACKGROUND OF THE INVENTION

1. Field of the Invention

The present invention relates to a liquid crystal panel, a liquid crystal display device using this liquid crystal panel, and electronic equipment incorporating this liquid crystal display device.

2. Description of the Related Art

Liquid crystal display devices ranging from small-sized devices used in projectors, cellular telephones, and the like to large-sized devices used in laptop personal computers, monitors, televisions, and the like are spreading rapidly along with the development of the multimedia age. In the meantime, medium-sized liquid crystal display devices are indispensable for electronic equipment such as viewers or personal digital assistants (PDAs) and for amusement machines such as portable game players and pachinko (Japanese pinball machines). In addition, liquid crystal display devices are used in many other devices including home electric appliances such as refrigerators, microwave ovens, and the like.

Today, most of liquid crystal display elements adopt the twisted nematic (TN) display mode. The liquid crystal display elements of the TN display mode apply nematic liquid crystal compositions, and driving methods for the liquid crystal are roughly divided into two methods. One of the methods is a simple matrix driving method. The other one is an active matrix method in which each pixel is provided with a switching element such as a thin-film transistor (TFT). At present, the TN-TFT mode which is a combination of the TN display mode and the active matrix method using TFTs is generally applied, for example.

Apart from the TN display mode, another mode for the liquid crystal display elements is called a super twisted nematic (STN) mode. Although contrast and viewing angle dependency are improved in this STN mode as compared to the conventional simple matrix method using the TN mode, the STN mode is not suitable for motion image displays due to slow response speed. In addition, the STN mode has another disadvantage which is low display quality as compared to the active matrix method using the TFTS. Accordingly, the liquid crystal display devices adopting the TN-TFT mode are now predominant in the market.

In the meantime, to meet the demand for higher image quality, various methods for improving the viewing angle have been developed and put to practical use. As a result, TFT active matrix liquid crystal displays adopting any of the following three modes, namely, a mode applying a compensating film to the TN mode, the in-plane switching (IPS) mode, and the multi-domain vertical aligned (MVA) mode, are now becoming mainstream for high-performance liquid crystal displays.

These active matrix liquid crystal display devices normally apply positive and negative writing of an image signal at a cycle of 30 Hz. Accordingly, an image is rewritten at a cycle of 60 Hz and time for one field is approximately equal to 16.7 ms (milliseconds). In this case, total time of both positive and negative fields is called one frame, which is approximately equal to 33.3 ms. In this context, the response speed of the current liquid crystal is almost equivalent to this frame time at the shortest.

There are two major demands for the liquid crystal display devices, namely, higher definition of images and improvement in response speed for images. The demand for the improvement in response speed reflects growing opportunities for liquid crystal display screens to display not only conventional still images but also motion images. Among those motion images, images particularly associated with high speed image changes such as sports videos and computer graphics in games require higher response speed than the current frame time.

Meanwhile, concerning the higher definition, 100 ppi (pixels per inch) is the current mainstream definition. There are two methods for achieving higher definition. One of the methods is to increase processing accuracy and reduce sizes of pixel elements, and the other one is to switch a backlight for illuminating a display device among red, green, and blue by time division and achieve multicolor displays by each pixel element. The latter method is referred to as the field sequential (time division) method and is now under consideration for application to color liquid crystal display devices. In this method, it is not necessary to divide the pixels into three groups and to spatially arrange corresponding color filters. Therefore, this method is deemed capable of achieving three times higher definition than conventional display devices and of improving light use efficiency due to an increase in numerical apertures. On the other hand, a field sequential liquid crystal display device is required to display one color within one-third of the time for one field, which is approximately equal to 5 ms. Therefore, the liquid crystal applied thereto must have the response speed less than 5 ms. After all, the improvement in response speed is also essential for achieving higher definition of images.

Various techniques have been studied to meet requirements for a liquid crystal display device which can respond to the above-described high speed images, and techniques concerning high speed liquid crystal display modes have been developed to date. These techniques concerning high speed liquid crystal display modes are categorized into two major trends. One of the trends is a technique to increase response speed of twisted nematic liquid crystal. The other one is a technique to use different liquid crystal which offers high speed response.

In general, the response time of liquid crystal is given by the following two formulae (see "Liquid Crystal Dictionary", edited by Liquid Crystal Section, The 142-nd Committee for Organic Materials for Information Science, Japan Society for the Promotion of Science, Baifukan Co., Ltd, pp. 24-25). Specifically, the following Formula 1 holds true for response at rise time when a voltage higher than a threshold voltage is applied to create an on-state. Meanwhile, the following Formula 2 holds true for response at decay time when the applied voltage higher than the threshold voltage is suddenly reduced to 0. In this case, d denotes a thickness of a liquid crystal layer, η denotes rotational viscosity, Δ∈ denotes dielectric anisotropy, V denotes the applied voltage, Vc denotes the threshold voltage, and K denotes a Frank elastic constant.

$$\tau_{rise} = \frac{d^2 \times \eta}{\Delta\varepsilon(V^2 - V_c^2)} \quad \text{(Formula 1)}$$

$$\tau_{decay} = \frac{d^2 \times \eta}{\pi^2 \times K} \quad \text{(Formula 2)}$$

In the meantime, the following Formula 3 holds true for the TN mode. In this case, $K_{11}$ denotes a splay elastic constant, $K_{22}$ denotes a twist elastic constant, and $K_{33}$ denotes a bend elastic constant.

$$K = K_{11} + \frac{1}{4}(K_{33} - 2K_{22}) \quad \text{(Formula 3)}$$

As it is apparent from the Formula 1, in terms of the response at rise time, the response time of liquid crystal is proportional to the reciprocal of the squared size of the applied voltage. In other words, the response time of liquid crystal depends on the squared reciprocals corresponding to voltage values which vary from one tone level to another. For this reason, the response time varies largely depending on the tone level. For example, a 10 times voltage differential causes a 100 times differential in the response time. On the contrary, whereas the differential in the response time depending on the tone level also exists in the response at decay time, the differential falls in the range of about 2 times.

From these aspects, the speed of the response at rise time is increased by an overdrive effect which is obtained by applying an extremely high voltage. In the meantime, the response used in an actual image display always corresponds to the response at decay time. Accordingly, the dependency on the tone level is extremely small. As a result, substantially equal response time is obtained throughout all the tones.

In light of the Formulae 1 to 3, conceivable measures for increasing the response speed of the nematic liquid crystal, which is the first technical trend, mainly include:

(1) reducing a cell gap and increasing electric field intensity while maintaining a constant voltage;
(2) increasing the electric field intensity by applying a high voltage to the liquid crystal to promote a state change of the liquid crystal (the overdrive method);
(3) increasing the dielectric anisotropy for sensitizing the response to the electric field;
(4) reducing the viscosity; and
(5) reducing the splay elastic constant ($K_{11}$) and the bend elastic constant ($K_{33}$) out of the elastic constants while increasing the twist elastic constant ($K_{22}$) to speed up the response at decay time.

Generally speaking, the following problem arises when drive speed of twisted nematic liquid crystal is simply increased. When the drive speed of the nematic liquid crystal is increased, a capacity of the liquid crystal varies largely depending on the dielectric anisotropy and on a difference in alignment directions of the liquid crystal. For example, in case of liquid crystal known by the product name DLC-43002, the dielectric constant in the parallel direction is equal to 11.8 and the dielectric constant in the vertical direction is equal to 3.7. Accordingly, the capacity change is immense when the drive speed is increased and a holding voltage to be written in and held by a liquid crystal layer is thereby reduced. Such reduction in the holding voltage, or reduction in an effective applied voltage, causes deterioration in contrast because insufficient writing occurs and the liquid crystal is not shifted to a desired position. Moreover, when the same signal is repeated as in a still image, luminance continues to fluctuate until the holding voltage stops decreasing and several frames are required for obtaining the stable luminance.

To prevent the response which requires several frames, it is essential that a signal voltage to be applied and a transmittance to be obtained establish a one-on-one correlation. In the active matrix drive, the transmittance after the response of the liquid crystal is not determined by the applied signal voltage but by electric charges accumulated in a capacitor of the liquid crystal after the response thereof. This is because the active matrix drive adopts a drive mode based on constant electric charges, in which the liquid crystal makes a response by use of the accumulated electric charges.

The electric charges supplied from an active element are determined by the accumulated electric charges prior to writing a given signal and by newly written electric charges while disregarding small leaks and the like. Moreover, the accumulated electric charges after the response of the liquid crystal also vary depending on pixel design values such as physical constants of the liquid crystal, electric parameters, or storage capacitance.

For this reason, the following are required for establishing the proper correlation between the signal voltage and the transmittance, namely:

(1) a correlation between the signal voltage and the written electric charges;
(2) the accumulated electric charges prior to writing; and
(3) information required for calculation of the accumulated electric charges after the response, and actual calculation based on the information, and the like.

As a result, it is necessary to install a frame memory for storing the values concerning (2) in terms of the entire screen, and a calculation unit for executing calculations concerning (1) and (3). Such installation invites an increase in the number of components in a system, and is therefore undesirable.

As a method of solving this problem, the reset pulse method configured to apply a reset voltage for resetting liquid crystal to a predetermined state before writing new data is often applied. As an example, the technique disclosed in International Display Research Conference (IDRC) 1997, pp. L-66 to L-99 will be described below.

The optically compensated birefringence (OCB) mode configured to align nematic liquid crystal into a pie-shape and to add a compensating film is applied in this document. The OCB mode is one of wide viewing angle modes. The OCB mode adopts a cell structure in which a phase compensating film (a biaxial retardation film) is provided to an antiparallel cell having a pretilt angle. A bias voltage is applied to homogeneous alignment to form bend alignment, and switching is performed by applying another voltage. The OCB mode has advantages of a wide viewing angle and short response time. The response speed of this liquid crystal mode ranges from approximately 2 ms to 5 ms, which is dramatically shorter than the conventional TN-TFT mode. Accordingly, the response is supposed to be completed within one frame. However, as described above, the holding voltage is considerably reduced by the variation in the dielectric constant attributable to the response of the liquid crystal, and several frames are required for obtaining the stable transmittance as similar to the conventional mode. Accordingly, there is proposed a method of writing a black display every time after writing a white display within one frame.

FIG. 1 is a graph showing variation in luminance according to the reset pulse method, in which the lateral axis indicates the time and the longitudinal axis indicates the luminance. In FIG. 1, a broken line indicates luminance variation in the case of normal drive, and a solid line indicates luminance variation when the reset pulse method is applied. As shown in FIG. 1, according to the normal drive method, the luminance is low at first two frames and reaches a stable level at the third frame. On the contrary, according to the reset pulse method, the luminance is always reset to a given state before writing new data and a one-on-one correlation equivalent to a certain written signal voltage to a certain transmittance is observed therein. Due to the one-on-one correlation, generation of driving signals is considerably simplified and means for storing the previous writing information such as a frame memory is not required therein.

Next, a configuration of a pixel in an active matrix liquid crystal display device will be described. FIG. 2 is a circuit diagram showing an example of a pixel circuit equivalent to one pixel in a conventional active matrix liquid crystal display device. As shown in FIG. 2, the pixel in the active matrix liquid crystal display device includes: an n-type metal oxide silicon (MOS) transistor (hereinafter referred to as an n-type transistor (Qn)) 904 of which a gate electrode is connected to a scan line 901, another one of electrodes is connected to a signal line 902, and the other electrode is connected to a pixel electrode 903; a storage capacitor 906 formed between the pixel electrode 903 and a storage capacitor electrode 905; and liquid crystal 908 interposed between the pixel electrode 903 and a counter electrode Vcom 907.

At present, liquid crystal display devices for laptop PCs and cellular telephones shaping the large application market for the liquid crystal display devices usually apply either an amorphous silicon thin film transistor (hereinafter referred to as an a-SiTFT) or a polysilicon thin film transistor (hereinafter referred to as a p-SiTFT) as the transistor (Qn) 904. Moreover, twisted nematic liquid crystal (hereinafter referred to as TN liquid crystal) is used as the liquid crystal material therein.

FIG. 3 is a circuit diagram showing an equivalent circuit of the TN liquid crystal. As shown in FIG. 3, the equivalent circuit of the TN liquid crystal can be expressed by a circuit in which a capacitance component C3 (its capacitance Cpix) of the liquid crystal, and, a value Rr of a resistance R1 as well as a capacitor C1 (its capacitance Cr), are connected in parallel. In this case, the resistance value Rr and the capacitance Cr are components which determine a response time constant of the liquid crystal.

FIG. 4 is a timing chart showing variations in a gate scan voltage Vg, a data signal voltage Vd, and a voltage at the pixel electrode 903 (hereinafter referred to as a pixel voltage) Vpix when the TN liquid crystal shown in FIG. 3 is driven by the pixel circuit shown in FIG. 2, in which the lateral axis indicates the time and the longitudinal axis indicates the voltage and the light transmittance. As shown in FIG. 4, the gate scan voltage Vg is set to a high level VgH in a period when this pixel is selected for horizontal scanning, whereby the n-type MOS transistor (Qn) 904 is set to on-state and the data signal voltage Vd inputted to the signal line 902 is transferred to the pixel electrode 903 through the n-type transistor (Qn) 904. The TN liquid crystal normally operates in the mode that allows light transmission when no voltage is applied thereto, or a so-called normally white mode.

At this time, a voltage for increasing the light transmittance of the light transmitted through the TN liquid crystal is applied for a period of several fields as the data signal voltage Vd. When the horizontal scanning period is over and the gate scan voltage Vg is set to a low level, the n-type transistor (Qn) 904 is set to off-state and the data signal voltage Vd transferred to the pixel electrode 903 is held by the storage capacitor 906 and by the capacitance Cpix of the liquid crystal. In this case, the pixel voltage Vpix causes voltage shifts called feedthrough voltages through source-gate capacitance of the n-type transistor (Qn) 904 at the time when the n-type transistor (Qn) 904 is set to off-state. The voltage shifts are indicated by Vf1, Vf2, and Vf3 in FIG. 4, and amounts of the voltage shifts Vf1 to Vf3 can be reduced by designing a large value for the storage capacitor 906.

The pixel voltage vpix is held in the subsequent field period until the gate scan voltage Vg is set to the high level again and the transistor (Qn) 904 is selected. In response to the pixel voltage Vpix thus held, the TN liquid crystal performs switching and the light transmitted through the liquid crystal transits from a dark state to a bright state as indicated by light transmittance T1. At this time, as shown in FIG. 4, the pixel voltage Vpix is shifted only by $\Delta V1$, $\Delta V2$, and $\Delta 3$ in the respective fields during the holding period. Such an aspect is attributable to variation in the capacitance of the liquid crystal which occurs in accordance with the response of the liquid crystal. To reduce such variation, the size of the storage capacitor 906 is normally designed at least two or three times larger than the pixel capacitance Cpix. In this way, it is possible to drive the TN liquid crystal by use of the pixel circuit shown in FIG. 2.

Meanwhile, as a technique having combined effects of the overdrive method and the reset method, Japanese Patent Publication No. 2001-506376 discloses a technique to modulate a common voltage which is a voltage at a common electrode (such as a counter electrode) disposed opposite to a pixel electrode. This technique will be described with reference to FIG. 5. FIG. 5 is a graph showing an operation of the technique to modulate the common voltage, in which the lateral axis indicates the time and the longitudinal axis indicates the voltage and the current.

The common voltage has been conventionally driven at a constant value for a period of one frame cycle (a period from $t_0$ to $t_2$ (or a period from $t_2$ to $t_4$) in FIG. 5 will be defined as one frame cycle), or alternatively, subjected to common inversion drive where the one frame cycle was further divided into two sub-periods and the voltage value was inverted between these two sub-periods. On the contrary, in the technique to modulate the common voltage, the common voltage which is the voltage at the common electrode disposed opposite to the pixel electrode is modulated as shown in FIG. 5. An upper part of FIG. 5 shows variation of the common voltage ($V_{CG}$) with time and a lower part thereof shows variation of the light transmittance (I) with time which is caused by the response of the liquid crystal. Specifically, a voltage waveform 151 represents a voltage waveform to be applied to the common electrode, an optical intensity waveform 152 represents an optical intensity waveform in a time scale corresponding to the waveform 151, and lines 153 to 156 represent pixel optical intensity curves.

One frame cycle is divided into two sub-periods and a voltage having approximately the same amplitude as in the conventional common inversion drive is applied for a sub-period from $t_1$ to $t_2$ (or a sub-period from $t_3$ to $t_4$). On the contrary, a voltage having higher amplitude than the amplitude in the common inversion drive (such as a voltage higher than the amplitude in the common inversion drive by an amount equivalent to performing a black display) is applied for a sub-period from $t_0$ to $t_1$ (or a sub-period from $t_2$ to $t_3$). According to this technique, it is possible to change the entire display area into the black display at high speed by an effect of an increased voltage differential between the pixel electrode and the common electrode in the sub-period from $t_0$ to $t_1$ when the high voltage is applied to the common electrode. In other words, a driving operation corresponding to the reset drive takes place. In addition, even when image data are written in the pixel electrode in the sub-period from $t_0$ to $t_1$, such data are not observed as a display image because a potential difference from the common electrode is sufficiently large (by an amount of the voltage for the black display, for example). The voltage at the common electrode is set back to the amplitude for the common inversion at the timing of $t_1$ after completion of writing the image data in the entire display area. As a consequence, the liquid crystal layer starts the response equivalent to the transmittance corresponding to each tone level in accordance with the voltage memorized in the pixel electrode. In other words, the voltage differential always changes from the high level to the level corresponding to the voltage value that represents each tone when starting the response. In this context, a sort of overdrive operation takes place in the sub-period from $t_0$ to $t_1$.

As a method of improving the response speed of the TN liquid crystal, there is also a method of increasing the speed by applying a different display mode using nematic liquid crystal. The method includes a method utilizing the electrically controlled birefringence (ECB) mode by taking advantage of birefringence, and a method utilizing the above-described optically compensated birefringence (OCB) mode, for example.

In addition, as the second trend, i.e. as the method of using liquid crystal other than the twisted nematic liquid crystal which can achieve high speed response, there is a technique to use spontaneous polarization type smectic liquid crystal.

However, the above-described conventional techniques have the following problems. First of all, as described previously, the conceivable measures for improving the response speed of the twisted nematic liquid crystal include (1) the measure to reduce the cell gap, (2) the measure to apply the high voltage to the liquid crystal, (3) the measure to increase the dielectric anisotropy, (4) the measure to reduce the viscosity, and (5) the measure to reduce the splay and bend elastic constants and to increase the twist elastic constant.

Of these measures, the cell gap (the thickness of the liquid crystal layer) in the measure (1) can be changed only within a certain relation with refractive index anisotropy $\Delta n$ so as to obtain a sufficient optical effect. In the meantime, the viscosity in the measure (2), the dielectric anisotropy in the measure (3), and the elastic constants in the measure (5) are all physical values. Accordingly, the values depend largely on the nature of materials and it is therefore extremely difficult to change only the physical values of each material. As a consequence, it is hard to achieve high speed effects as estimated from the formulae. For example, whereas $K_{11}$, $K_{22}$, and $K_{33}$ are mutually independent elastic constants, a correlation defined as $K_{11}:K_{22}:K_{33}=10:5:14$ is satisfied in many cases according to results of measurement of actual materials (oral disclosure by Merck). Therefore, it is not always appropriate to treat these constants as the independent constants. For instance, it is possible to derive a formula $K=11 \times K_{22}/5$ by use of the above-mentioned correlation and the Formula 3. In this case, only $K_{22}$ is deemed independent.

Meanwhile, the applied voltage in the measure (4) is also restricted because an increase in the voltage causes an increase in power consumption as well as a cost increase in a drive circuit. Moreover, when active elements such as thin film transistors are provided and driven in a display device, the applied voltage is also restricted by withstanding voltage of the elements. Accordingly, the conventional efforts to increase the response speed are almost marginal.

In the meantime, the above-described reset pulse method disclosed in the IDRC 1997 pp. L-66 to L-69 can improve the response speed of the TN type display device to some extent. However, as shown in FIG. 1, the reset pulse method can only achieve a display screen which hardly realizes the original degree of luminance the device is designed for. As a result, there still remains the problem of low light use efficiency and a failure to acquire sufficient light transmittance.

The reason is the fact that the response speed of the typical nematic liquid crystal is slow, and that the response speed of the most widely used TN liquid crystal is slow in particular. Due to the slow response speed, the display device cannot rise sufficiently from the black display at the reset state to the image display mode within a required period, and thereby fails to obtain the required light transmittance. That is, when switching from the black display into the white display, the display device fails to achieve the complete white display and ends up with gray display. On the other hand, when switching from the white display to the black display, the display device fails to achieve the complete black display and ends up with the gray display similarly. Moreover, in a tone display, the response speed may be even slower as described previously. Accordingly, the device cannot achieve expected tone levels when displaying motion images or the like.

In addition, in this reset method the slow response speed also causes the following problem. For example, there is a case where the liquid crystal does not respond sufficiently to achieve the complete black display upon resetting. In this case, the same transmittance may not be obtained by writing the same piece of data for several times. Such an aspect is attributable to a failure to establish the complete predetermined state of alignment of the liquid crystal as a reset operation is imperfect. In this case, the liquid crystal exhibits the transmittance as the response after resetting which reflects a hysteresis of a previous frame. As a consequence, the one-on-one correlation between the applied voltage and the transmittance is not satisfied any longer.

Furthermore, there are problems concerning a slow start of optical response of the liquid crystal after resetting and observation of abnormal optical response prior to the start of the normal optical response. The reason is that the direction of action of the liquid crystal is not definite at the point when the liquid crystal transits from the predetermined state of alignment achieved by resetting to the normal response, and the liquid crystal may perform uneven or unstable response instead.

It is considered that the response time of the TN liquid crystal is equivalent to several tens of milliseconds as a sum of the response time for rising and the response time for decaying, and that the response time becomes much longer and would reach a hundred milliseconds or more as the response during the tone display. As shown in the Formula 1 described above, the response time for rising is normally proportional to a squared value of the thickness. Therefore, a transmissive display device requires four times more response time than a reflective display device. As a result, light use efficiency is significantly deteriorated in the transmissive display device.

Meanwhile, the method of driving the TN liquid crystal in the OCB mode or the like has a problem of stringent demands for production accuracy and uniformity, and a resultant decline in yields. This is because the thickness of the liquid crystal layer requires higher accuracy, or because it is necessary to use optical elements such as compensating films or retardation films that satisfy a high degree of uniformity.

For example, in the case of the electrically controlled birefringence (ECB) mode utilizing the birefringence, the demand for the accuracy of the thickness of the liquid crystal layer is about 3% of the thickness of the liquid crystal layer in order to achieve the contrast equal to 100. In that case, when the thickness is equal to or less than 3 µm, the unevenness in the thickness must be equal to or less than 90 nm. When higher display conditions such as the contrast are required, the demand for the accuracy of the thickness will be even more stringent.

Similarly, the OCB mode also has problems that it is generally difficult to obtain the uniform and stable bend alignment, and moreover, that a high degree of stability is required in the manufacturing process because the cell gap (the thickness of the liquid crystal) and properties of compensating films must be highly uniform.

In either case, the demand for the accuracy of the thickness of the liquid crystal layer is about 3% of the thickness of the liquid crystal layer in order to achieve the contrast equal to 100. In that case, when the thickness is equal to or less than 3 μm, the unevenness in the thickness must be equal to or less than 90 nm. When higher display conditions such as the contrast are required, the demand for the accuracy of the thickness will be even more stringent.

Furthermore, the technique to use the spontaneous polarization type smectic liquid crystal, which can achieve high-speed response, also has the following problems. Specifically, the spontaneous polarization type smectic liquid crystal is also associated with stringent demands for production accuracy and uniformity, and with a resultant decline in yields. This is because, when a smectic liquid crystal mode is used instead of the TN mode in order to increase the response speed, the thickness of the liquid crystal layer requires a higher accuracy. Another reason is that it is necessary to use optical elements such as compensating films or retardation films that satisfy a high degree of uniformity. In the meantime, the spontaneous polarization type smectic liquid crystal requires an extremely high level of flatness of a substrate surface as compared to the nematic liquid crystal of the TN type and the like. In this case, even tiny irregularities on a surface of an indium tin oxide (ITO) electrode, which is a transparent electrode, become problematic.

In this way, all the above-described conventional methods have difficulties in further improving the response speed while maintaining practical yields.

SUMMARY OF THE INVENTION

An object of the present invention is to provide a liquid crystal panel having sufficient response speed, a liquid crystal display device using this liquid crystal panel, and electronic equipment incorporating this liquid crystal display device.

A liquid crystal panel according to the present invention includes: a transistor array substrate having pixel electrodes and thin film transistors for driving the pixel electrodes, the pixel electrodes and the thin film transistors being formed at a surface of the substrate; an opposite substrate provided so as to the opposite to the surface of the transistor array substrate and having a common electrode formed at a surface thereof which is opposed to the transistor array substrate; and a liquid crystal layer being disposed between the transistor array substrate and the opposite substrate, and being formed twisted nematic liquid crystal. In this case, assuming that a twist pitch of the twisted nematic liquid crystal is p and a thickness of the liquid crystal layer is d, a relation defined as p/d<20 holds true.

It is more preferable that a relation defined as p/d<8 is satisfied between the twist pitch p (μm) of the twisted nematic liquid crystal and the thickness d (μm) of the liquid crystal layer.

It is preferable that the twisted nematic liquid crystal layer undergoes polymer stabilization. The polymer stabilization can be achieved by adding a photocurable monomer to the twisted nematic liquid crystal and exposing the mixture to light.

In this case, it is preferable that the photocurable monomer is a liquid crystalline monomer having a liquid crystalline framework, and diacrylate can be used as the liquid crystalline monomer herein.

Alternatively, it is preferable that the liquid crystalline monomer is monoacrylate in which a polymerizable functional group is bonded to the liquid crystalline framework without interposition of a methylene spacer.

Moreover, the liquid crystal panel may include a drive circuit for driving the twisted nematic liquid crystal, and the drive circuit may be formed on the transistor array substrate.

In this case, it is preferable that the drive circuit is an overdrive circuit which can apply a high voltage to the liquid crystal by modulating a common voltage but without raising a power voltage.

It is preferable that a direction obtained by projecting a direction of a maximum electric field out of all electric fields occurring inside the liquid crystal layer except electric fields occurring between the pixel electrodes and the common electrode onto the substrate surface is parallel to a direction obtained by projecting a direction of alignment of the liquid crystal in the center of the liquid crystal layer when no voltage is applied to the liquid crystal layer, onto the substrate surface.

When a pretilt angle of the twisted nematic liquid crystal relative to the substrate surface is equal to, or smaller than, an angle for stabilizing reverse twist alignment, torque to recover normal twist alignment is generated at the decay time of the liquid crystal. In this case, it is preferable that the pretilt angle is equal to or smaller than 16 degrees.

It is more preferable that the pretilt angle is equal to or smaller than 5 degrees. In this way, a difference between energy when applying the electric fields and energy when not applying the electric fields is increased.

It is preferable that an anchoring strength in the direction of the pretilt angle of the twisted nematic liquid crystal is an anchoring strength which does not unstabilize the normal twist alignment. In this case, it is preferable that the anchoring strength is equal to, or larger than, $10^{-5}$ [J/m$^2$].

A liquid crystal display device according to the present invention includes the liquid crystal panel. Moreover, in the liquid crystal display device, the liquid crystal panel may be driven by a field sequential method. In this case, the liquid crystal display device may include a light source disposed on a back side of the liquid crystal panel for sequentially emitting light in a plurality of colors, a splitter for splitting a piece of image data into a plurality of pieces of color image data respectively corresponding to the plurality of colors, and a synchronizer for synchronizing timings for the light source to emit the light in the plurality of colors with timings for the plurality of pieces of color image data to be outputted to the liquid crystal panel. In this case, the liquid crystal panel may be configured to display the plurality of pieces of color image data sequentially.

Electronic equipment according to the present invention includes the liquid crystal display device.

The present invention aims at increasing the response speed of the twisted nematic liquid crystal at decay time by means of establishing the relation defined as p/d<20 between the twist pitch p and the thickness of the twisted nematic liquid crystal layer (the gap between the substrates) d.

Occurrence of an unstable state of alignment such as a bounce is prevented by increasing the response speed of the liquid crystal at decay time. Accordingly, it is possible to realize a stable image within one frame and thereby to obtain a fine display image without image degradation (such as uneven tones or flickers) attributable to the hysteresis. It is also possible to obtain a fine display image without blurry motion, and to perform fine image display at low temperature regardless of variation in environmental temperature, which had been another problem of the conventional techniques.

In addition, the response speed of the liquid crystal at decay time is increased and the liquid crystal can gain a stable transmittance more quickly. In this way, the light use efficiency is improved. Therefore, it is possible to obtain a low power consumption liquid crystal display device.

BRIEF DESCRIPTION OF THE DRAWINGS

FIGS. 7A to 7H are cross-sectional views sequentially showing a method of manufacturing a polysilicon TFT (of a planar structure) array depending on the steps thereof;

FIG. 8 is a graph showing response speed of liquid crystal at rise time, in which the lateral axis indicates the (p (twisted pitch)/d (thickness of liquid crystal layer)) value and the longitudinal axis indicates the inclination of variation in a transmittance when the transmittance is around 50%;

FIG. 17 is a graph showing a simulation result in terms of an influence of a pretilt angle to an energy difference, in which the lateral axis indicates the pretilt angle of the liquid crystal and the longitudinal axis indicates the energy difference between reverse twist alignment and normal twist alignment.

DETAILED DESCRIPTION OF THE PREFERRED EMBODIMENTS

Figure 6:
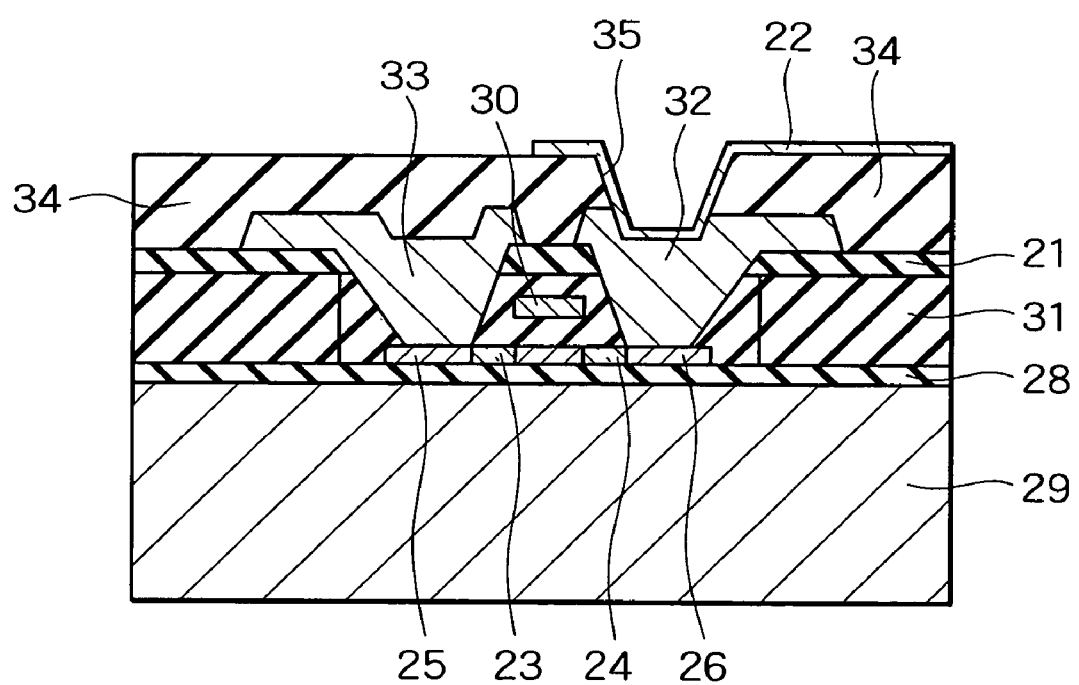
FIG. 6 is a cross-sectional view showing a unit structure of a TFT array in a liquid crystal panel according to a first embodiment of the present invention.

Embodiments of the present invention will be described below in detail with reference to the accompanying drawings. Now, a first embodiment of the present invention will be described. FIG. 6 is a cross-sectional view showing a unit structure of a TFT array in a liquid crystal panel according to the embodiment of the present invention. The TFT array shown in FIG. 6 is a polysilicon TFT array, which is formed by modifying amorphous silicon into polysilicon.

As shown in FIG. 6, the polysilicon TFT has a structure in which a silicon oxide film 28 is formed on a glass substrate 29 and a polysilicon layer is locally formed thereon. This polysilicon layer is formed by depositing amorphous silicon on the silicon oxide layer 28, then modifying the amorphous silicon into polysilicon by annealing with an excimer laser, and then patterning the polysilicon. A gate oxide film is formed in a thickness of 10 nm on a surface of this polysilicon layer. In FIG. 6, the gate oxide film corresponds to a lower portion of a silicon oxide layer 31 (a portion below a gate electrode 30).

A pair of drain region 25 and source region 26 are formed mutually separately on this polysilicon layer. Moreover, in a region on the polysilicon layer between the drain region 25 and the source region 26, a lightly doped drain (LDD) region 23 is formed in a region being in contact with the drain region 25, and another LDD region 24 is formed in a region being in contact with the source region 26. The LDD region 23 and the LDD region 24 are mutually isolated, and a region between the LDD region 23 and the LDD region 24 is defined as a channel region.

After forming the polysilicon layer, the drain region 25 and the source region 26 are formed by doping phosphorus ions in the relevant locations on the polysilicon layer while using a photoresist as a mask. The photoresist has slightly larger patterns in the positions corresponding to the drain region 25 and the source region 26 as compared to the size of the gate (so as to form the LDD regions 23 and 24 later).

Meanwhile, the gate electrode 30 is provided immediately above the channel region on the gate oxide film. The gate electrode 30 is a lamination of an amorphous silicon layer and a tungsten silicide (WSi) layer. To form the gate electrode 30, the lower portion of the silicon oxide layer 31 constituting the gate oxide film is deposited, and then the amorphous silicon layer and the tungsten silicide (WSi) layer are deposited thereon. Subsequently, a photoresist is patterned appropriately, and then the amorphous silicon layer and the tungsten silicide layer are patterned into the shape of the gate electrode by use of the photoresist as a mask. The LDD regions 23 and 24 are formed by doping phosphorus ions only into the necessary regions of the polysilicon layer while using the photoresist for patterning the gate electrode 30 as a mask.

As described above, while the lower portion of the silicon oxide film 31 is formed into the gate insulating film, the silicon oxide film 31 is also formed around and above the gate electrode 30. In this way, the silicon oxide film 31 is formed so as to bury the gate electrode 30 as a whole. In addition, a silicon nitride film 21 is formed on the silicon oxide film 31. Meanwhile, contact holes are provided in the silicon oxide film and in the silicon nitride film 21, and a drain plug 32 and a source plug 33 made of aluminum and titanium are formed inside the contact holes and connected to the drain electrode 25 and the source electrode 26, respectively.

Moreover, an insulating film 34 is formed on the silicon nitride film 21, and a contact hole 35 is formed on this insulating film 34. Meanwhile, a pixel electrode 22 made of an indium tin oxide (ITO) film is formed on the insulating film 34. This pixel electrode 22 is connected to the source plug 33 through the contact hole 35.

The silicon oxide film 31, the silicon nitride film 21, the drain plug 32, the source plug 33, and the pixel electrode 22 are formed as described below. Specifically, after the silicon oxide film 31 and the silicon nitride film 21 are deposited continuously, the contact holes are formed and then the aluminum layer and the titanium layer are formed by sputtering. Then, the aluminum layer and the titanium layer are patterned to form the source plug 33 and the drain plug 32. Thereafter, the silicon nitride film 21 and the insulating film 34 are formed on the entire surface, and then the contact hole 35 is formed therein. Subsequently, the ITO film is formed on the entire surface and is patterned into the transparent pixel electrode 22.

In this way, the TFT array including, a pixel array made of TFT switches, and a scan circuit as a drive circuit, is formed on the glass substrate by forming the planar-type TFT pixel switches as shown in FIG. 6.

In this embodiment, although the TFTs are formed by modifying the amorphous silicon into the polysilicon, it is also possible to form the TFTs by means of depositing the polysilicon and then improving grain sizes of the polysilicon by laser irradiation. Apart from the excimer layer, it is also possible to use a continuous wave (CW) laser.

Alternatively, it is possible to form an amorphous silicon TFT array by omitting the process to modify the amorphous silicon into the polysilicon by laser irradiation.

FIGS. 7A to 7H are cross-sectional views sequentially showing a method of manufacturing the polysilicon TFT (of the planar structure) array depending on the steps thereof. Now, the method of manufacturing the polysilicon TFT array will be described in detail by use of FIGS. 7A to 7H.

As shown in FIG. 7A, a silicon oxide film 11 is formed on a glass substrate 10, and then an amorphous silicon layer 12 is deposited thereon. Next, the amorphous silicon layer 12 is annealed by irradiating an excimer layer, whereby the amorphous silicon is modified into polysilicon.

Then, as shown in FIG. 7B, a silicon oxide film 13 is deposited in a thickness of 10 nm and is subjected to patterning.

Figure 7C:
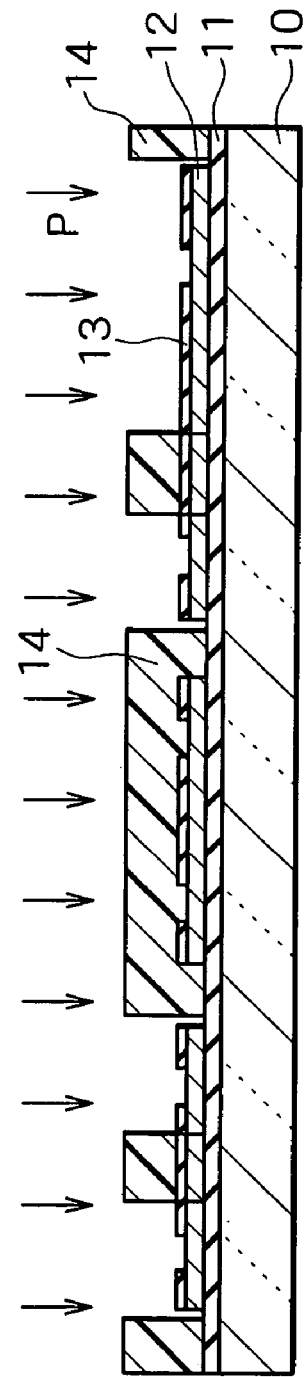

Subsequently, as shown in FIG. 7C, a photoresist 14 is coated and patterned (for masking a p-channel region), and then phosphorus (P) ions are doped to form n-channel source and drain regions.

Figure 7D:
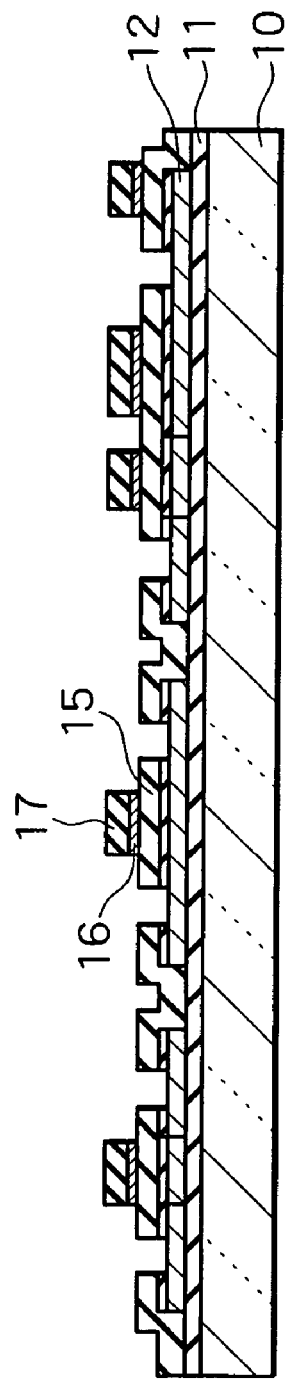

Next, as shown in FIG. 7D, a silicon oxide film 15 for forming a gate insulating film is deposited in a thickness of 90 nm, and then an amorphous silicon layer 16 and a tungsten silicide (WSi) 17 for constituting gate electrodes are deposited and patterned into gate shapes. In this way, gate electrodes are formed.

Then, as shown in FIG. 7E, a photoresist 18 is coated and patterned (for masking the n-channel region), and then boron (B) is doped to form p-channel source and drain regions. Regions between the source and drain regions constitute channel regions. In this way, the above-described source and drain regions, the channel regions, the gate insulating film, and the gate electrodes collectively constitute TFTs for a pixel switch.

Next, as shown in FIG. 7F, after the silicon oxide film and the silicon nitride film 19 are deposited continuously, the contact holes are formed.

Figure 7G:
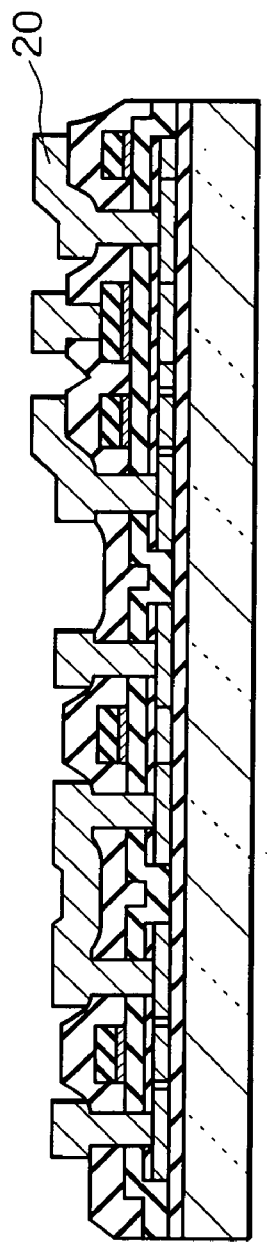

Next, as shown in FIG. 7G, an aluminum film and a titanium film are formed by sputtering and then subjected to patterning. Accordingly, drain plugs and source plugs 20 are formed. Source and drain electrodes of CMOS transistors (not shown) for peripheral circuits, data wiring (not shown) to be connected to the drains of the pixel switch TFTs, and contacts to pixel electrodes are formed in this patterning process.

Figure 7H:
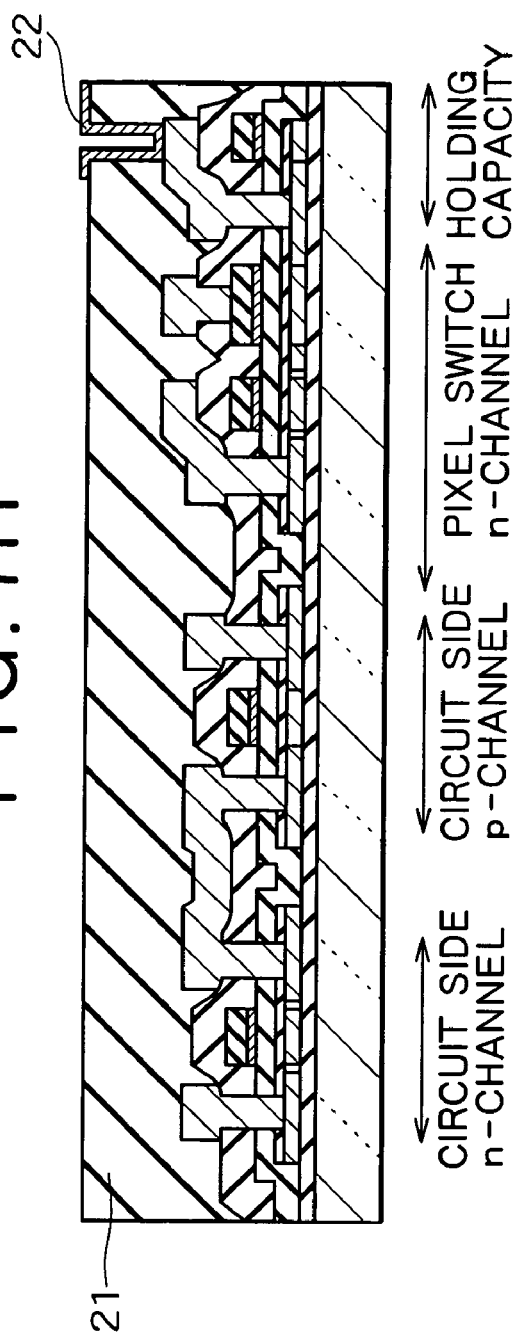

Subsequently, as shown in FIG. 7H, a silicon nitride film 21 is formed as an insulating film and a contact hole is formed thereon. Then, an ITO film is formed thereon and is patterned to form a pixel electrode 22 which is a transparent electrode. In this way, the TFT pixel switches of the planar structure are serially formed to finish the TFT array substrate.

Figure 1:
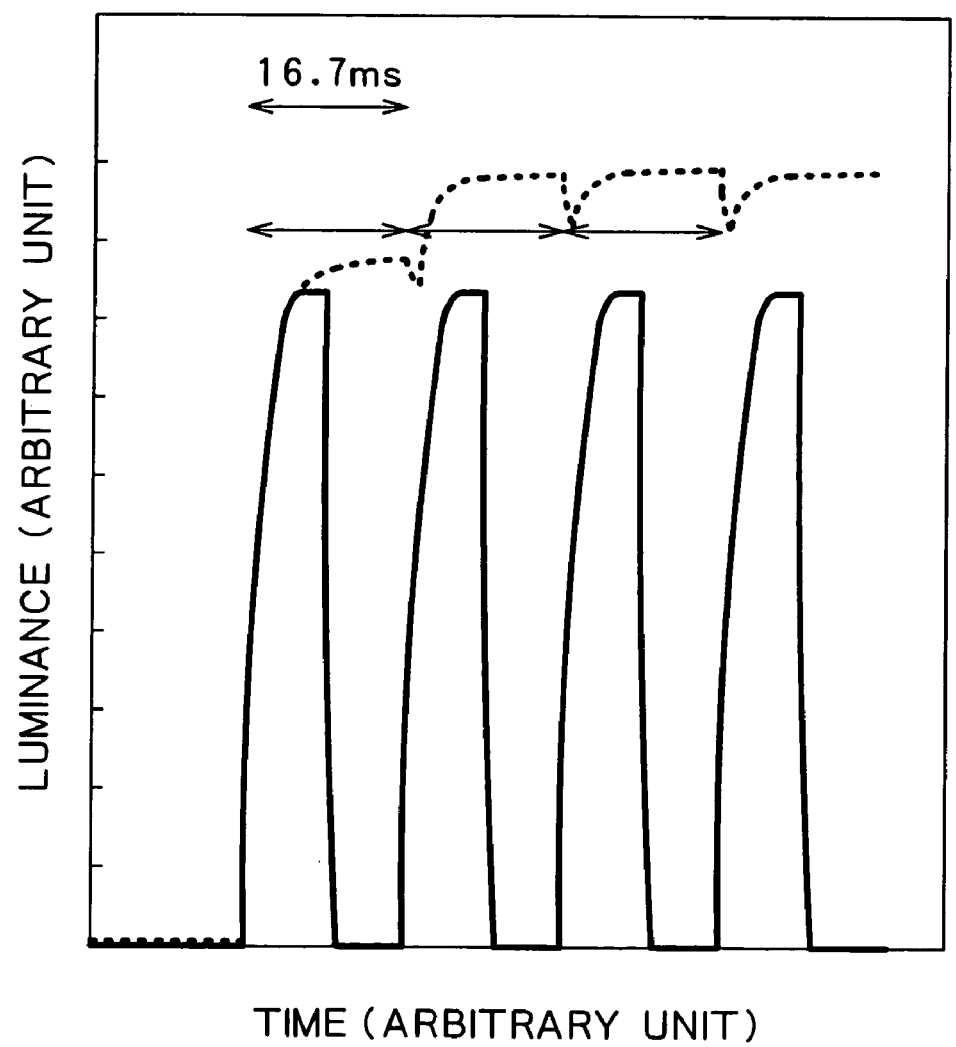
FIG. 1 is a graph showing variation in luminance according to the reset pulse method, in which the lateral axis indicates the time and the longitudinal axis indicates the luminance.
Figure 2:
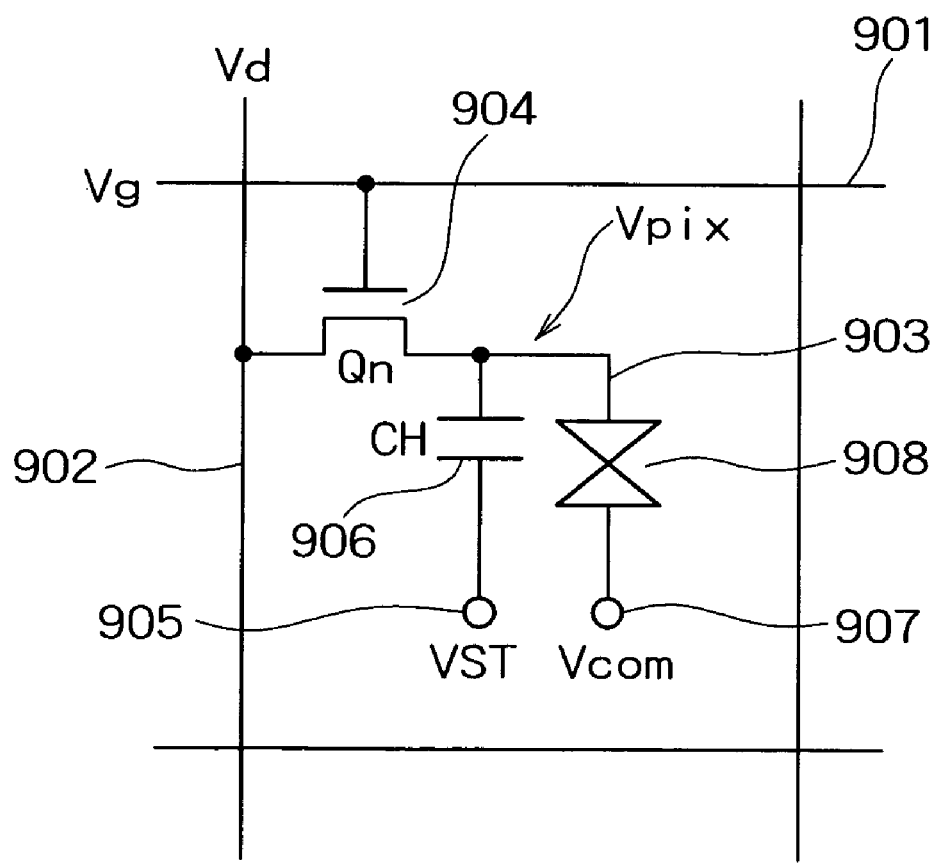
FIG. 2 is a circuit diagram showing an example of a pixel circuit equivalent to one pixel in a conventional active matrix liquid crystal display device.
Figure 3:
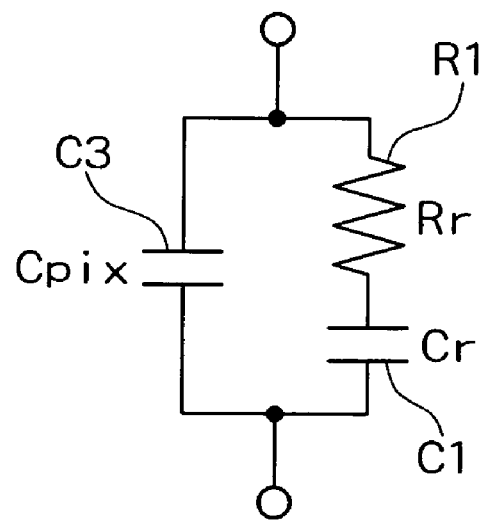
FIG. 3 is a circuit diagram showing an equivalent circuit of TN liquid crystal.
Figure 4:
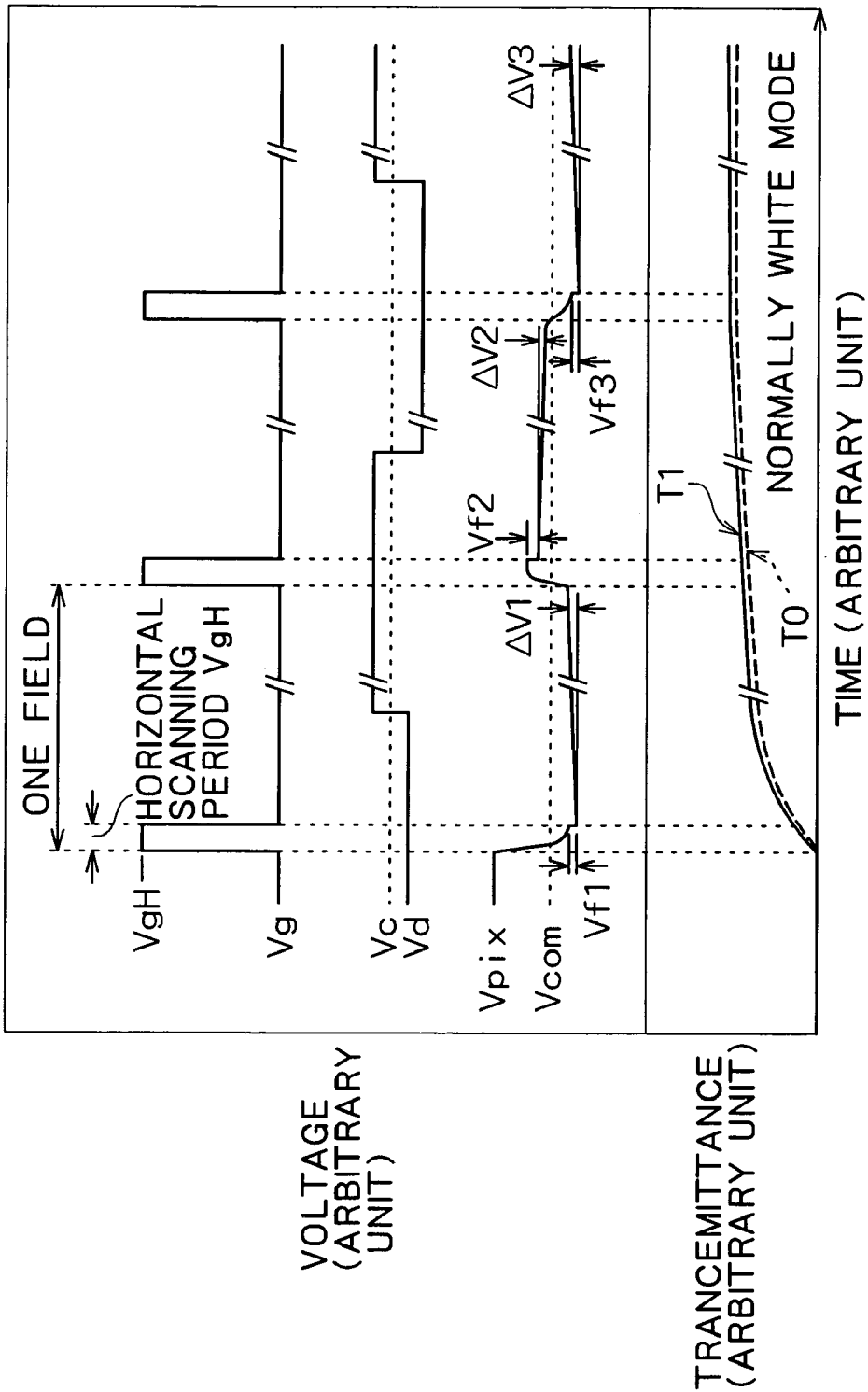
FIG. 4 is a timing chart showing variations in a gate scan voltage Vg, a data signal voltage Vd, and a pixel voltage Vpix when the TN liquid crystal shown in FIG. 3 is driven by the pixel circuit shown in FIG. 2, in which the lateral axis indicates the time and the longitudinal axis indicates the voltage and the light transmittance.

Next, a liquid crystal layer is interposed between the TFT array substrate thus produced and an opposite substrate including a counter electrode thereon. In this way, a liquid crystal panel is formed. In the liquid crystal panel of this embodiment, configurations of the respective pixel circuits formed on the TFT array substrate are similar to the configuration of the pixel circuit in the conventional liquid crystal panel as shown in FIG. 2 and FIG. 3.

Concerning the counter electrode, an ITO film is formed on the entire surface of a glass substrate for the opposite substrate and then the ITO film is subjected to patterning. Thereafter, a chromium patterning layer is formed for light shielding. Alternatively, the light shielding chromium patterning layer may be formed before forming the ITO film on the entire surface.

In addition, columns having sizes of 2 μm are formed on the opposite substrate by patterning. These columns are used as spacers for maintaining the cell gap, and are also provided with impact-resistant functions.

As the columns are provided for maintaining the cell gap, it is possible to adjust the sizes of the columns appropriately depending on the design of the liquid crystal panel.

Alignment films are printed on surfaces of the TFT array substrate and the opposite substrate which face each other, and the alignment films are subjected to rubbing so as to realize mutually perpendicular aligning directions upon assembly. Thereafter, a seal member for ultraviolet curing is coated on the opposite substrate so as to surround pixel regions. After aligning and adhering the TFT array substrate and the opposite substrate together, liquid crystal is put into the gap to form the liquid crystal panel.

Although the chromium patterning layer constituting the light shielding film is provided on the opposite substrate in this case, it is also possible to provide the patterning layer on the TFT array substrate. Needless to say, any other materials can be used instead of chromium as long as such materials can shield the light. For example, WSi (tungsten silicide), aluminum, and the like are applicable.

There are two types of structures when forming the light shielding chromium patterning layer on the TFT array substrate. The first structure is to form the light shielding chromium patterning layer on the glass substrate. After the formation of the light shielding patterning layer, it is possible to manufacture the liquid crystal panel of the first embodiment similarly. The second structure is to provide the light shielding chromium patterning layer in the last place after manufacturing the TFT array substrate as similar to the first embodiment.

When the light shielding chromium patterning layer is formed on the TFT array substrate, it is not always necessary to form the light shielding chromium patterning layer on the opposite substrate. The opposite substrate can be manufactured by forming the ITO film on the entire surface of the glass substrate and then subjecting the ITO film to patterning.

Moreover, in the liquid crystal panel according to this embodiment, nematic crystal is used as a liquid crystal material for forming the liquid crystal layer to be placed between the TFT array substrate and the opposite substrate. In this case, assuming that a twist pitch is p and a dimension between the TFT array substrate and the opposite substrate, i.e. the thickness of the liquid crystal layer is d, the nematic crystal satisfies a relation defined as (p/d)<8.

Meanwhile, a liquid crystal display device according to this embodiment includes the above-described liquid crystal panel. In addition, electronic equipment according to this embodiment is electronic equipment including this liquid crystal display device. Such electronic equipment may be a projector, a cellular telephone, a laptop personal computer, a monitor, a television, or a PDA, for example.

Now, concrete examples concerning characteristics of the liquid crystal panel according to this embodiment will be described below. Firstly, liquid crystal materials having mutually different twist pitches are prepared and liquid crystal panels are manufactured by use of the respective liquid crystal materials. In addition, a pair of polarizing plates are disposed outside the panel to obtain the normally white display. In this case, the gap between the substrates (the thickness of the liquid crystal layer) is set to 2 μm and the liquid crystal materials used therein have the twist pitches of 6 μm, 20 μm, and 60 μm, respectively.

The response speed is in inverse proportion to a squared value of the thickness of the liquid crystal layer. For example, when the thickness of the liquid crystal layer is set to 6 μm (three times thicker), the response speed is reduced to ⅑. For this reason, the thickness of the liquid crystal layer is preferably set equal to or less than 4 μm, or more preferably equal to or less than 3 μm. Although there is no restriction concerning the thinness, in view of limitations in the twist pitch of the liquid crystal and difficulties in manufacturing the substrates with a certain gap therebetween, the thickness of the liquid crystal layer is preferably set equal to or more than 0.5 μm, or more preferably equal to or more than 1 μm.

Moreover, an overdrive circuit is provided. An overdrive is applied at rise time when a high voltage is necessary, and is not applied at decay time when the applied voltage is reduced.

Based on the above-described configurations, "time to transmittance" characteristics of the liquid crystal at rise time (the optical response of the liquid crystal at decay time (i.e. the response from a dark state to a bright state in the case of the normally white display mode)) were observed. Each of the liquid crystal panels is driven from a black display mode to a completely transparent white state, and an inclination of variation in the transmittance around 50% is obtained from the observed "time to transmittance" characteristic. The range around 50% was chosen to reflect the largest variation in the transmittance. FIG. 8 shows a graph plotting the inclinations, in which the longitudinal axis indicates the inclination (%/ms) thus observed and the lateral axis indicates the (p (twisted pitch)/d (thickness of liquid crystal layer)) value. It is needless to say that the thickness of the liquid crystal layer is equivalent to the dimension of the gap between the substrates.

From FIG. 8, it is apparent that the inclination is increased when the (twist pitch/thickness of liquid crystal layer) value is reduced and the response of the liquid crystal at decay time is increased. Particularly, in the first embodiment, the inclination sharply rises when the (twist pitch/thickness) value is approximately equal to 15, and the inclination exceeds 50 (%/ms) when the (twist pitch/thickness) value is approximately equal to 3. In other words, the response within 2 milliseconds is conceptually possible. Between the cases where the (twist pitch/thickness) values are 30 and 3 in this graph, the inclination at the value of 3 is almost twice as large as the inclination at the value of 30. Accordingly, it is apparent that the optical response time of the liquid crystal at decay time can be reduced by half. Meanwhile, the response speed can be increased by 15% or higher at the (twist pitch/thickness) value of 10 as compared to the case where the value is 30.

In short, such an effect is achieved by large torque to recover an initial state of alignment where no voltage is applied (in other words, a state of alignment where the liquid crystal is uniformly twisted between the substrates). The operation of the present invention is not obtained directly from the Formula 1 and the Formula 2 which are the equations for the response time. However, it is possible to understand this operation by considering the energy. The following Formula 4 is an equation for free energy density using a physical effect of the liquid crystal material per se (i.e. which does not include external effects such as electric fields).

$$f_d = \frac{1}{2} \times \left\{ K_{11} \times (\overline{V} \cdot \tilde{n})^2 + K_{22} \times \left[ \tilde{n} \cdot (\overline{V} \cdot \tilde{n}) + \frac{2\pi}{p} \right] + K_{33} \times [\tilde{n} \cdot (\overline{V} \cdot \tilde{n})^2] \right\}$$ (Formula 4)

In this case, the first, second, and third terms represent a term concerning splay deformation, a term concerning twist deformation, and a term concerning bend deformation, respectively. As it is apparent from this energy equation, the twist pitch p has an effect to change the value of the term concerning the elastic constant $K_{22}$. To be more precise, when the twist pitch is shortened, the term concerning the constant $K_{22}$ is increased. When the constant $K_{22}$ is applied to the Formula 2 which is for the response at decay time, the response time is reduced by the increase in the constant $K_{22}$.

By use of these effects, the present invention can increase the response speed of the liquid crystal at decay time which had been reaching the limit by the restrictions in terms of the physical values of the materials.

Although the overdrive operation is used in the first embodiment, it is needless to say that the response time of the liquid crystal at decay time is increased even when the overdrive operation is not applied.

Next, a second embodiment of the present invention will be described. A TFT array substrate constituting a liquid crystal panel has more irregularities on the surface as compared to a substrate used for the simple matrix drive, because the TFTs (the thin film transistors) are formed on the substrate. The irregularities on the substrate surface interfere with the alignment of the liquid crystal. Therefore, it is preferable to stabilize the alignment of the liquid crystal relative to the irregularities on the substrate. The second embodiment of the present invention provides the liquid crystal with an alignment stabilization process in order to prevent disturbance to the liquid crystal attributable to the irregularities on the substrate surface. In this embodiment, the alignment of the liquid crystal is stabilized even when the TFT array substrate has the irregularities.

In this embodiment, the liquid crystal layer is placed between the TFT substrate and the opposite substrate as similar to the first embodiment. In addition, the same liquid crystal material as the material used in the first embodiment, i.e. the twisted nematic liquid crystal possessing the same pitch, is also used in this embodiment.

Figure 9:
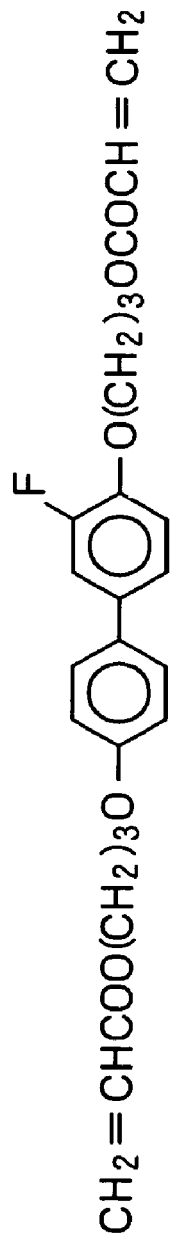
FIG. 9 is a view showing a structural formula of photocurable diacrylate liquid crystalline monomer according to a second embodiment of the present invention.

Concerning the liquid crystal, the twisted nematic liquid crystal with addition of 2% photocurable diacrylate liquid crystalline monomer having a structural formula shown in FIG. 9 is put in. The twisted nematic liquid crystal is polymerized by irradiating ultraviolet rays having an intensity of 1 mW/cm$^2$ for 600 seconds without voltage application. In this way, a TN type display device of a normally white display mode is obtained.

Figure 10:
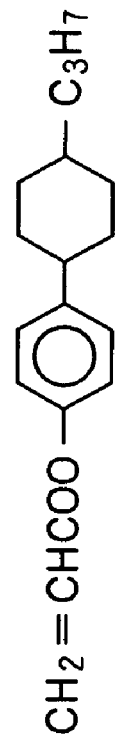
FIG. 10 is a view showing a structural formula of photocurable monoacrylate liquid crystalline monomer in which a polymerizable functional group is bonded to a liquid crystalline framework without interposition of a methylene spacer.

In addition to the above-described configuration, it is also possible to form another display device by putting in the twisted nematic liquid crystal with addition of 2% photocurable monoacrylate liquid crystalline monomer having a structural formula shown in FIG. 10, in which a polymerizable functional group is bonded to a liquid crystalline framework without interposition of a methylene spacer, and then by polymerizing the twisted nematic liquid crystal by irradiating light without voltage application. The response of the liquid crystal to the voltage is less restricted by addition of the monomer when the monomer does not contain the methylene spacer. It is needless to say that other types of liquid crystalline monomers are applicable, provided that addition amounts of such monomers are properly adjusted.

Although it is sufficient when the addition amount of the monomer is equal to or more than 0.5% relative to the liquid crystal to stabilize the alignment of the liquid crystal against the irregularities on the substrate, it is more preferable when the addition amount is equal to or more than 1%. In terms of the response of the liquid crystal, the monomer does not inhibit the response when the addition amount is equal to or less than 5%. However, it is more preferable when the addition amount is equal to or less than 3%.

In the second embodiment, it is preferable that the light shielding film is formed on the TFT substrate. The reason is as follows. Upon polymerization by the light irradiation, the light is irradiated from the counter electrode side. The light loss is significant on the TFT substrate side because the TFTS, the pixel electrodes, the wiring, and the like are formed thereon, and it is therefore difficult to irradiate the light uniformly to the monomer. In this way, the light irradiation is not performed from the TFT array substrate side. When the light shielding film is formed on the opposite substrate, unreacted monomer remains in the portions shielded by the light shielding film after the light irradiation. When the unreacted monomer remains therein, the unreacted monomer may cause a problem such as interference with the alignment of the liquid crystal which is attributable to subsequent polymerization of the unreacted monomer by outside light while the state of alignment of the liquid crystal is uncertain. Such a problem eventually causes a reliability problem.

When no light shielding chromium patterning layer is formed on the opposite substrate for shielding the light, the irradiated light for curing the liquid crystalline monomer is not shielded but fully irradiated onto the polymerizing monomer. As a consequence, no unreacted monomer will remain therein.

The high speed response similar to the first embodiment is also achieved by this embodiment. The polymer stabilization is equivalent to addition of free energy density fstab. By performing the stabilization with respect to the twisted alignment, the polymer stabilization provides the free energy density fstab with an effect similar to an increase in the constant $K_{22}$ in the Formula 4. Particularly, when the photocurable monomer to be added is the liquid crystalline monomer having the liquid crystalline framework, it is possible to achieve the stabilization without deteriorating the liquid crystalline properties and the alignment of the liquid crystal.

By using diacrylate as the liquid crystalline monomer, it is possible to increase density of a three-dimensional cross-linking structure and thereby to achieve a fine polymer stabilization effect. Moreover, by using monoacrylate as the liquid crystalline monomer in which the polymerizable functional group is bonded to the liquid crystalline framework without interposition of the methylene spacer, the liquid crystalline framework is directly bonded to a polymer main chain after the polymerization and the motion of the liquid crystalline framework is thereby restricted. As a result, the liquid crystalline framework contributes to stabilization of the alignment. Owing to these operations, it is conceivable that the torque to recover the initial state of alignment without voltage application is increased and the higher response speed is thereby achieved in the response at decay time.

In the second embodiment as well, the optical response of the liquid crystal at decay time exhibits a sharp rise of the inclination when the (twisted pitch/thickness) value is around 15 as similar to the first embodiment. In addition, the inclination exceeds 50 when the (twisted pith/thickness) value is around 3.

As a modified example of the second embodiment, the response speed of the liquid crystal was studied by use of the liquid crystal panels subjected to the polymer stabilization as similar to the second embodiment, while changing the material for the light shielding film from chromium to aluminum and putting the liquid crystal materials having various twist pitches as similar to the first embodiment into the liquid crystal panels. As a result, it is learned that excellent contrast is achieved in addition to the improvement in the response speed of the liquid crystal obtained by the first and second embodiments. This is due to the fact that the light shielding film made of aluminum has higher reflectance than chromium and is therefore capable of significantly reducing light leak currents.

The first and second embodiments can improve the optical response speed of the liquid crystal, in particular, the optical response speed of the liquid crystal at decay time. By performing the reset driving in the first and second embodiments, it is possible to solve the problem in the conventional techniques that the same transmittance may not be obtained by writing the same piece of data for several times. It is because the response speed of the liquid crystal at decay time is improved and the state of alignment of the liquid crystal is returned to the predetermined state every time by resetting. In this way, the response time is appropriately defined as the time between the reset state and a desired tone state. Particularly, when the black display mode is selected as the reset state, it is possible to improve a residual motion image property attributable to hold-type display elements being unique to the liquid crystal. In other words, the black resetting image exhibits a shutter effect and it is possible to bring hold-type response closer to the impulse-type response. When the black resetting image is applied, the response at tone display is defined by the response of the liquid crystal at decay time. In this case, the increase in the response speed of the liquid crystal at decay time according to the present invention exerts a significant effect.

It is apparent that the second embodiment can reduce luminance fluctuation on the entire liquid crystal panel more effectively than the first embodiment. It is also apparent that the liquid crystal is less susceptible to the irregularities on the substrate.

The present invention is particularly effective when using a drive circuit for modulating a common voltage, which is configured to combine the overdrive operation and the reset operation, because it is not necessary to set a high power voltage.

Figure 11:
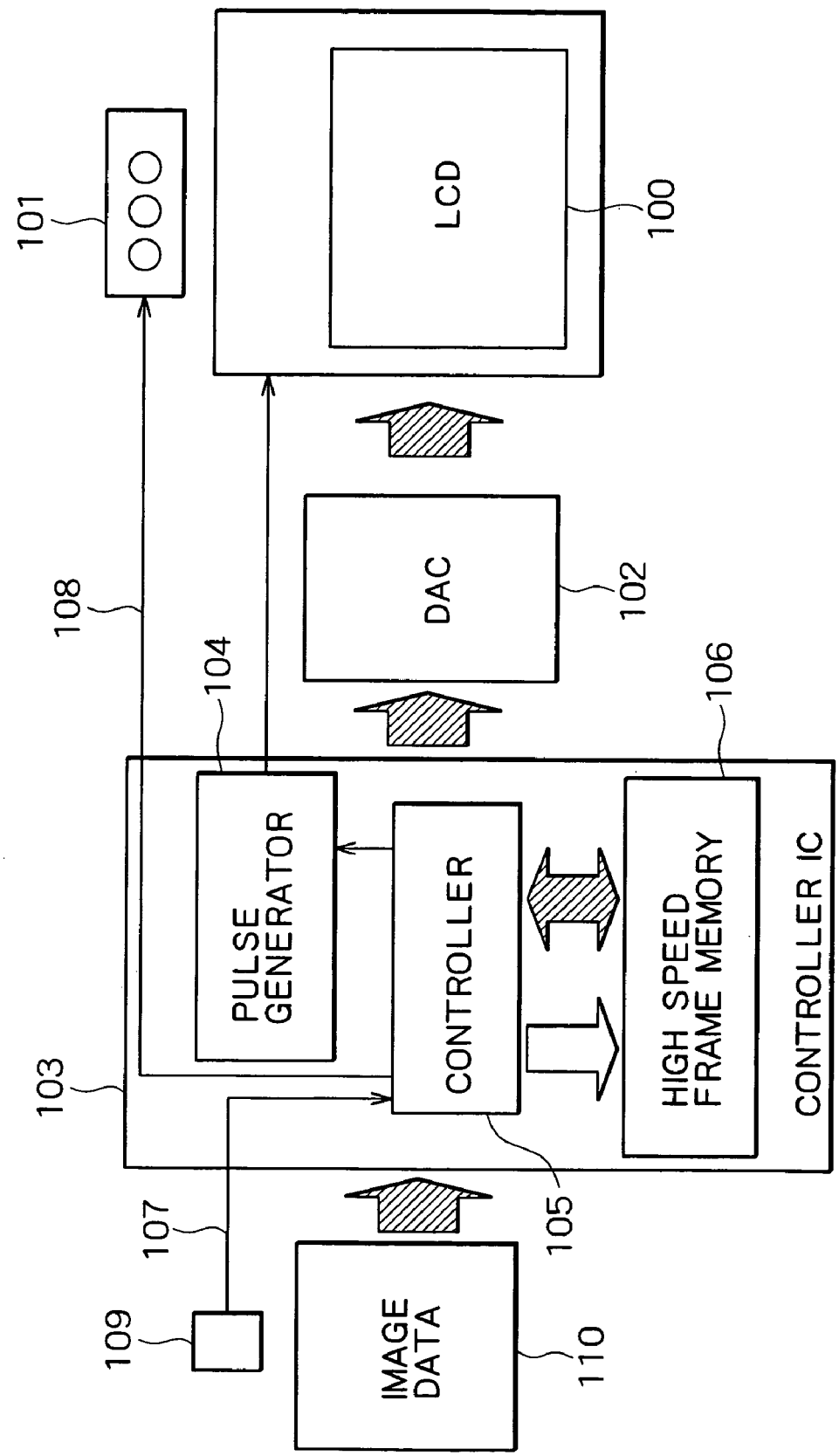
FIG. 11 is a block diagram showing a liquid crystal display device according to a third embodiment of the present invention.

Next, a third embodiment of the present invention will be described. A liquid crystal panel similar to the first embodiment is also used herein. FIG. 11 is a block diagram showing a liquid crystal display device according to this embodiment. As shown in FIG. 11, the liquid crystal display device of this embodiment constitutes a field sequential display system. To be more precise, a controller integrated circuit (IC) 103 incorporating a controller 105, a pulse generator 104, and a high speed frame memory 106 performs image processing of normal image data 110 inputted from outside and converts the image data 110 into respective color data in red, blue, and green. Then, the controller IC 103 outputs the color image data to a digital analog converter (hereinafter referred to as the DAC) 102 based on synchronization signals 107 inputted from a synchronizer 109.

The DAC 102 converts the color image data composed of digital signals into analog signals, and outputs the analog signals to a liquid crystal panel (LCD) 100. A scan circuit inside the LCD 100 is controlled by drive pulses which are inputted from the pulse generator 104 in the controller IC 103. Meanwhile, light emitting diodes (LEDS) 101 in three colors are disposed on the back side of the LCD 100 as light sources. The controller IC 103 outputs LED control signals 108 to the LEDs 101 based on the synchronization signals 107. Controlled by the LED control signals 108, the LEDs 101 sequentially emit light in the three colors of red, blue, and green so as to synchronize displays based on the color image data for the LCD 100. In this way, color images in the three colors of red, blue, and green are displayed by time division.

Figure 5:
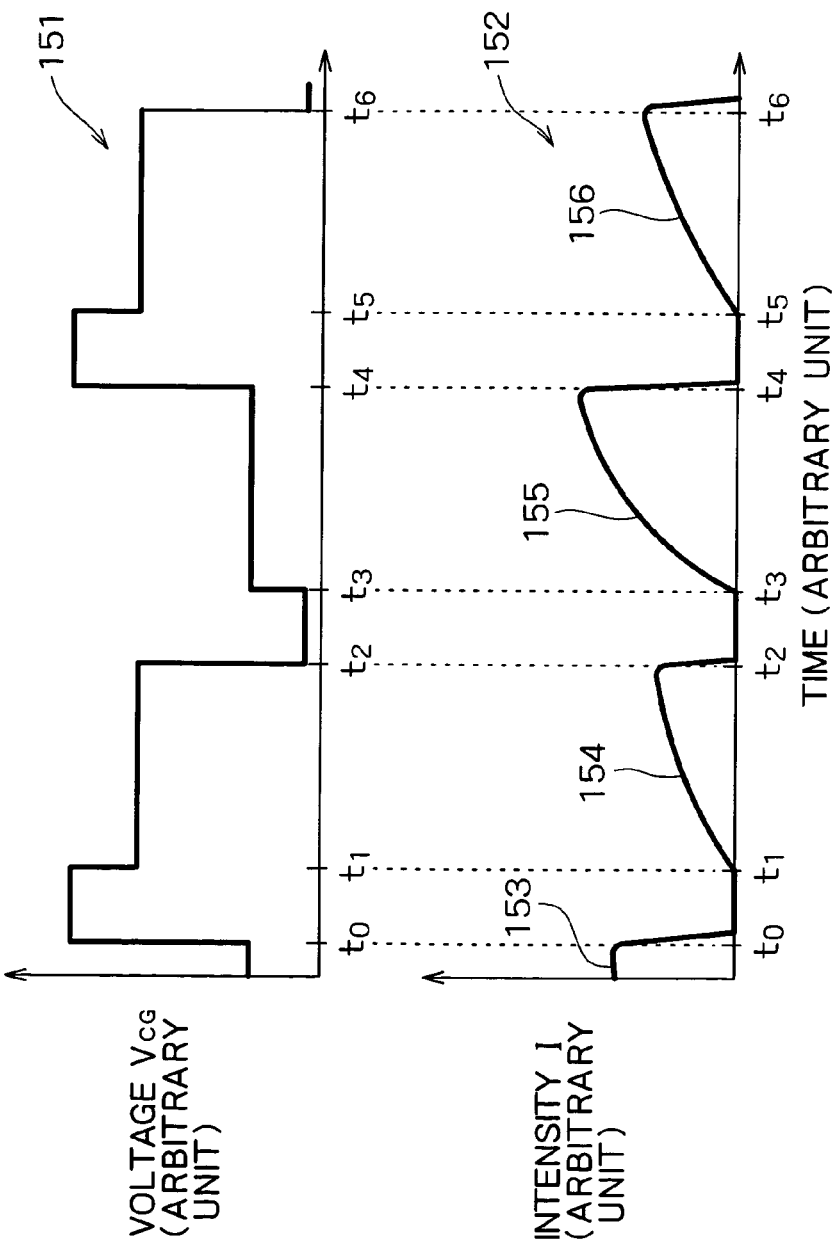
FIG. 5 is a graph showing an operation of a technique to modulate a common voltage, in which the lateral axis indicates the time and the longitudinal axis indicates the voltage and the current.
Figure 12:
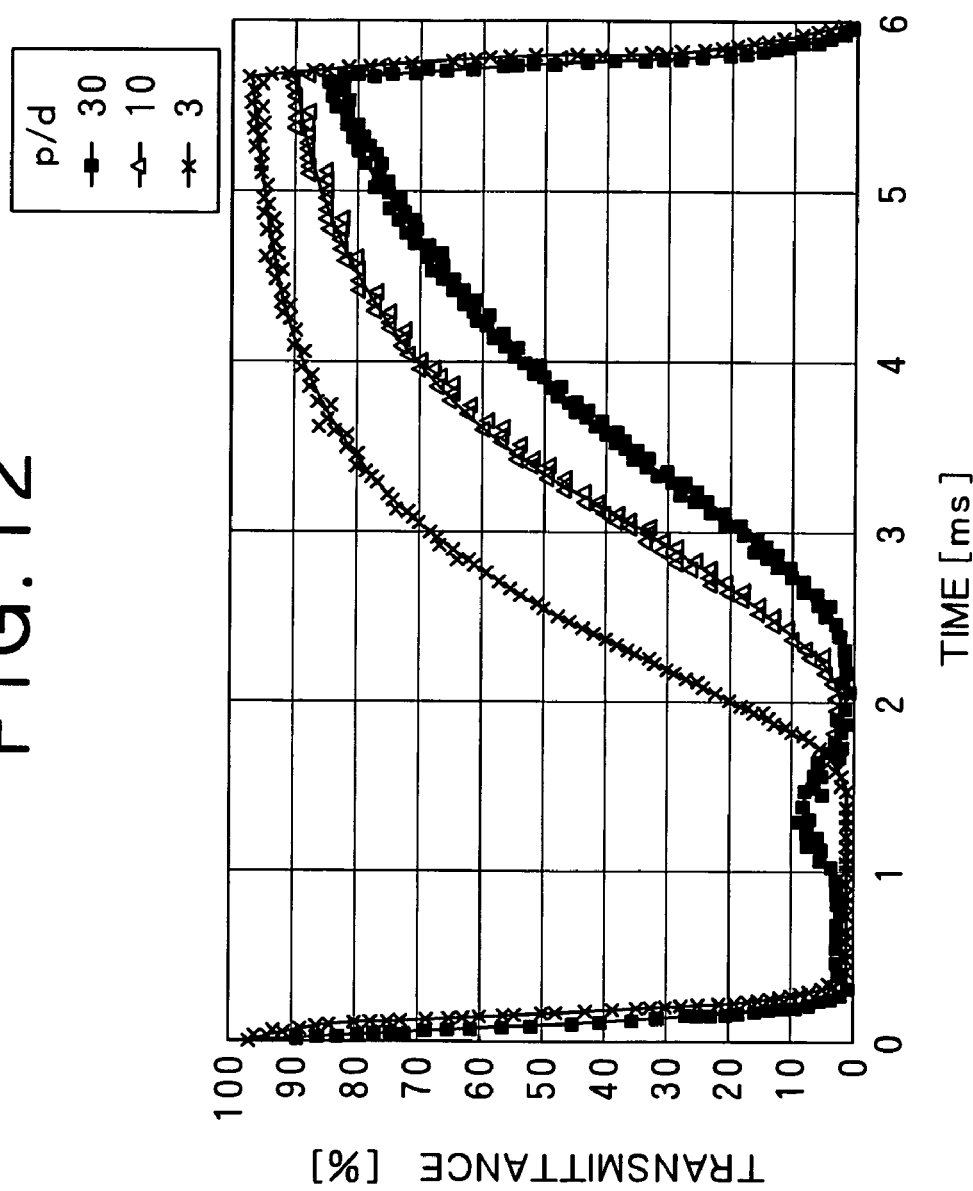
FIG. 12 is a graph showing measurement results of variations in transmittances with time, in which the lateral axis indicates the time and the longitudinal axis indicates the transmittance.

This embodiment applies a driving operation for modulating the common voltage as shown in FIG. 5. In this case, one subframe (i.e. the period from $t_0$ to $t_2$ shown in FIG. 5) is set to 5.56 ms. A length of a period from $t_0$ to $t_1$ for changing the common voltage corresponding to the reset and overdrive into a high voltage is set to 0.8 ms. FIG. 12 shows measurement results of variations in transmittances with time in this state. FIG. 12 shows the results under three conditions where the (p/d) values are 30, 10, and 3 as similar to the first embodiment. Under the conditions where the (p/d) values are 30 and 10, the transmittance is temporarily increased. The response time becomes longer upon occurrence of such an increase in the transmittance (hereinafter referred to as a bounce). The bounce is hardly observed when p/d=3. On the other hand, the inclination of variation of the transmittance is not steep when p/d=30 but is the steepest when p/d=3. At an ending point of the subframe, the transmittance does not reach 90% when p/d=30. By contrast, the transmittance is slightly over 90% when p/d=10, and nearly 100% when p/d=3.

Figure 13:
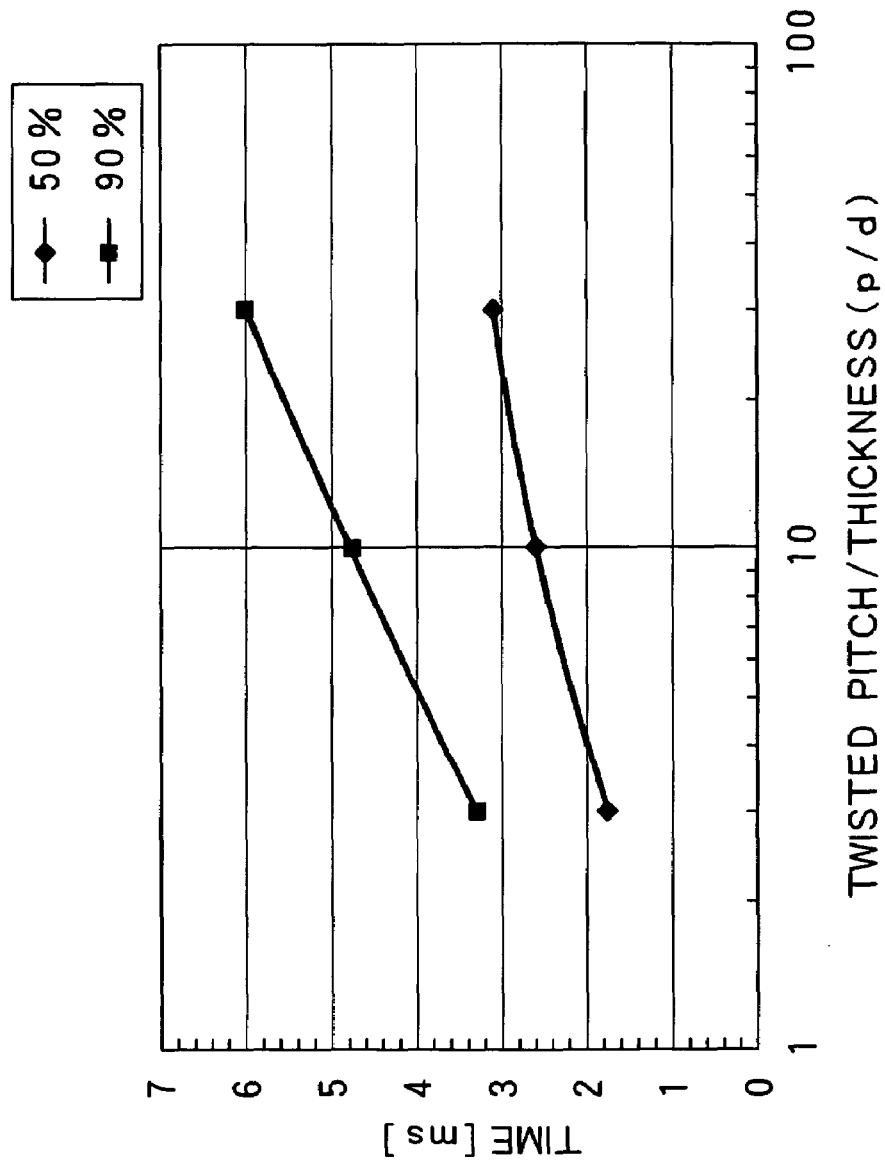
FIG. 13 is a graph showing response speed of the transmittance, in which the lateral axis indicates the (p/d) value and the longitudinal axis indicates the time consumed for allowing the transmittance to reach 50% and to 90%.

FIG. 13 shows a graph plotting the time consumed for allowing the transmittance to reach 90% and 50%, which is obtained from the results in FIG. 12. In FIG. 13, the lateral axis indicates the (p/d) value and the longitudinal axis indicates the time. As apparent from FIG. 13, the transmittance can reach 90% response within the subframe period of 5.56 ms provided that the (p/d) value is below 20. Moreover, when the (p/d) value is below 20, the transmittance can reach 50% response within a half of the subframe period which is equal to 2.78 ms. Accordingly, it is apparent that a sufficient transmittance is achieved when p/d<20 is satisfied.

Figure 14:
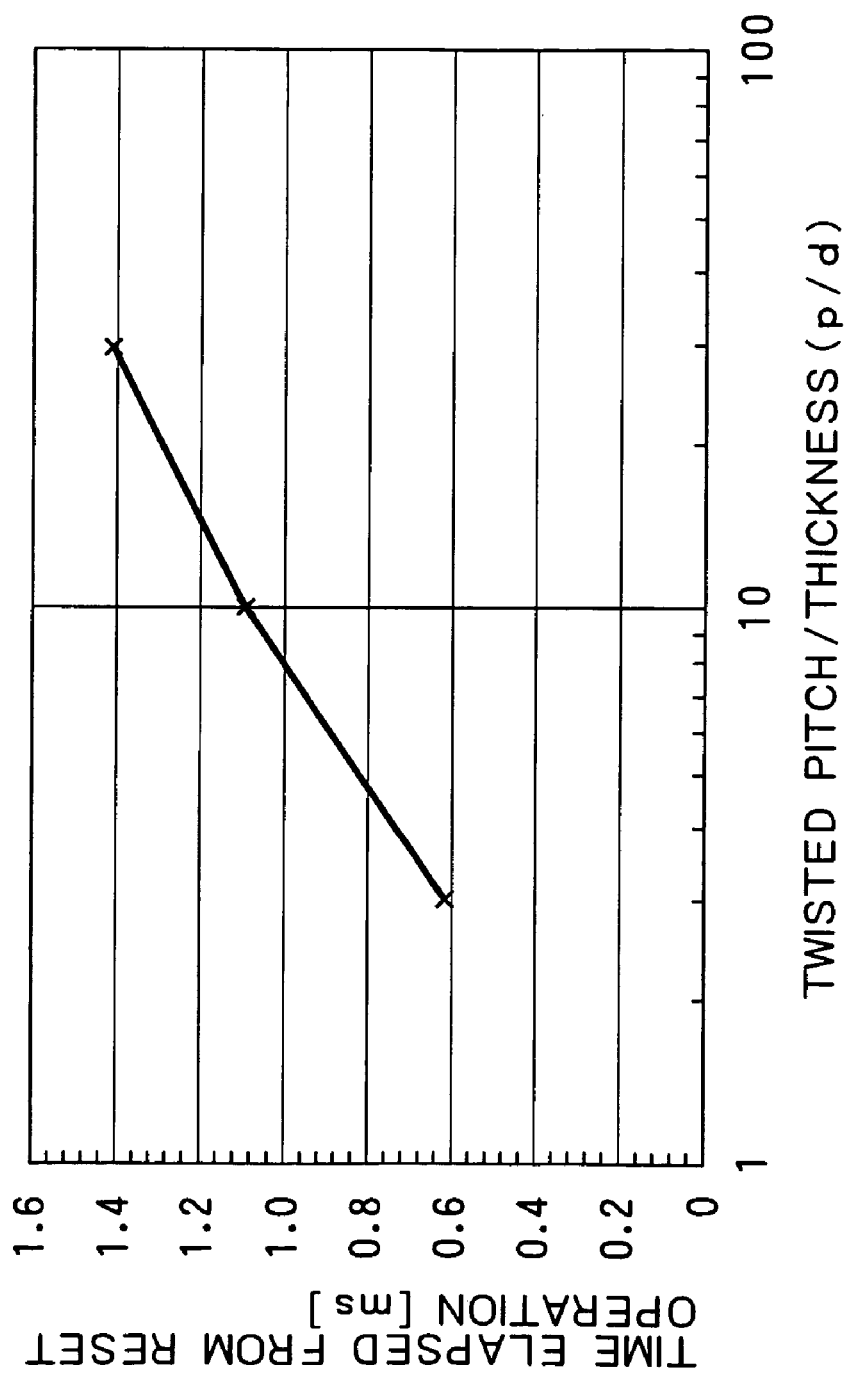
FIG. 14 is a graph showing rising speed of the liquid crystal, in which the lateral axis indicates the (p/d) value and the longitudinal axis indicates the time elapsed from a reset operation to a start of rise of an optical response.

Meanwhile, the time elapsed from a reset operation to a start of rise of the optical response is obtained from the results in FIG. 12. Specifically, the respective graphs after resetting are extrapolated to the transmittance of 0% along with the inclinations at the points where the transmittance is 10%. Then, differences between the time representing intersections of the extrapolated graphs and the transmittance of 0%, and, the ending time of resetting (equal to 0.8 ms herein) are obtained. The result is shown in FIG. 14. As apparent from FIG. 14, the time after resetting until the start of response falls below 1 ms on the condition that the p/d value is below 8. When the time falls below 1 ms, it is possible to utilize the time within the subframe effectively.

Figure 15:
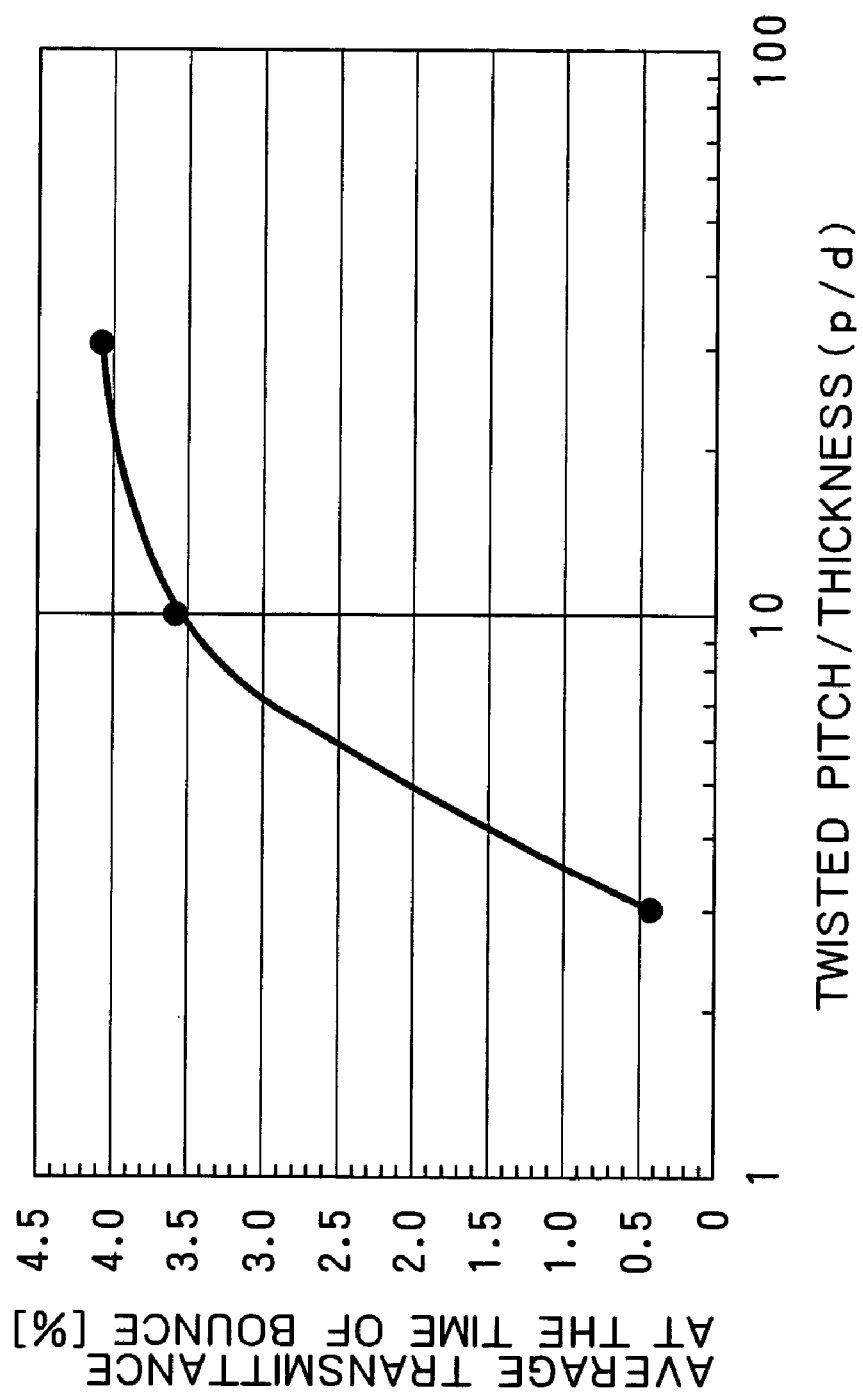
FIG. 15 is a graph showing an influence of the (p/d) value to a bounce, in which the lateral axis indicates the (p/d) value and the longitudinal axis indicates the average transmittance during the bounce.

In addition, an average transmittance of the bounce generated in the period from the time after resetting in FIG. 12 and the rise time of the optical response obtained in FIG. 14 is obtained. Specifically, an integral of the transmittance at the time of the bounce is divided by the time consumed for the start of the response shown in FIG. 14 to obtain the average transmittance. The result is shown in FIG. 15. As apparent from FIG. 15, concerning the average transmittance in the course of the bounce, the inclination changes at the point where p/d=8, and the average transmittance tends to suddenly drop thereafter. In this way, a bend is observed. Sudden reduction of bounces is achieved by the condition defined as p/d<8. Such reduction of bounces indicates that a one-on-one correlation is achieved by canceling a relation with data for a previous subframe, and that a fine display is achieved for a long period of time without causing an unstable alignment state.

As described above, to obtain the sufficient response speed of the twisted nematic liquid crystal, it is essential that the relation p/d<20 is satisfied where the twisted pitch of the liquid crystal is p and the thickness of the liquid crystal layer is d. It is more preferable that the relation p/d<8 is satisfied. These relations are also applicable to the first and second embodiments.

Although it is publicly known already, it is possible to apply a driving operation corresponding to normal common inversion drive to the driving operation for modulating the common voltage. As a result, assuming that a conventional data signal has a difference from the common voltage in the range of ±4.5 V, for example, it was necessary to perform driving by use of an amplitude range of 9 V in the past. On the contrary, the common inversion drive can reduce the amplitude range by half into 4.5 V. Moreover, in the configuration to modulate the common voltage, the liquid display device is always reset to the black display mode. Accordingly, the voltage actually required for the tone display is equivalent to the difference from the voltage for the black display.

Specifically, when a threshold value of the liquid crystal is 1.5 V, a difference of 3 V from the voltage of 4.5 V for the black display is equal to the actually required voltage. Accordingly, it is possible to reduce necessary data amplitude to 3 V by arranging the process of modulating the common voltage, which is only ⅓ of the requirement in the past. As a result, unlike the conventional overdrive method or the reset method, the high speed response can be achieved by the driving operation requiring extremely low power consumption. Particularly, the response speed is accelerated nearly by 50% by the present invention. Accordingly, it is possible to achieve a high-luminance field sequential display with low power consumption even by use of the TN liquid crystal. In this field sequential drive, excellent motion image display performances are achieved as well as excellent color reproducibility because of the constant reset operations.

It is possible to increase the response speed with low power consumption by means of incorporating the present invention with a combination of the overdrive operation, the reset pulse operation, and the common voltage modulation.

As described above, since the fine field sequential drive can be realized by use of the TN liquid crystal, it is not necessary to pay high attention to uniformity of the cell gap or uniformity of the compensating film as in the case of the OCB method. Moreover, a special material such as ferroelectric liquid crystal is used therein. Since usual materials are applicable, a product of the present invention has reliability for a long term period.

Figure 16:
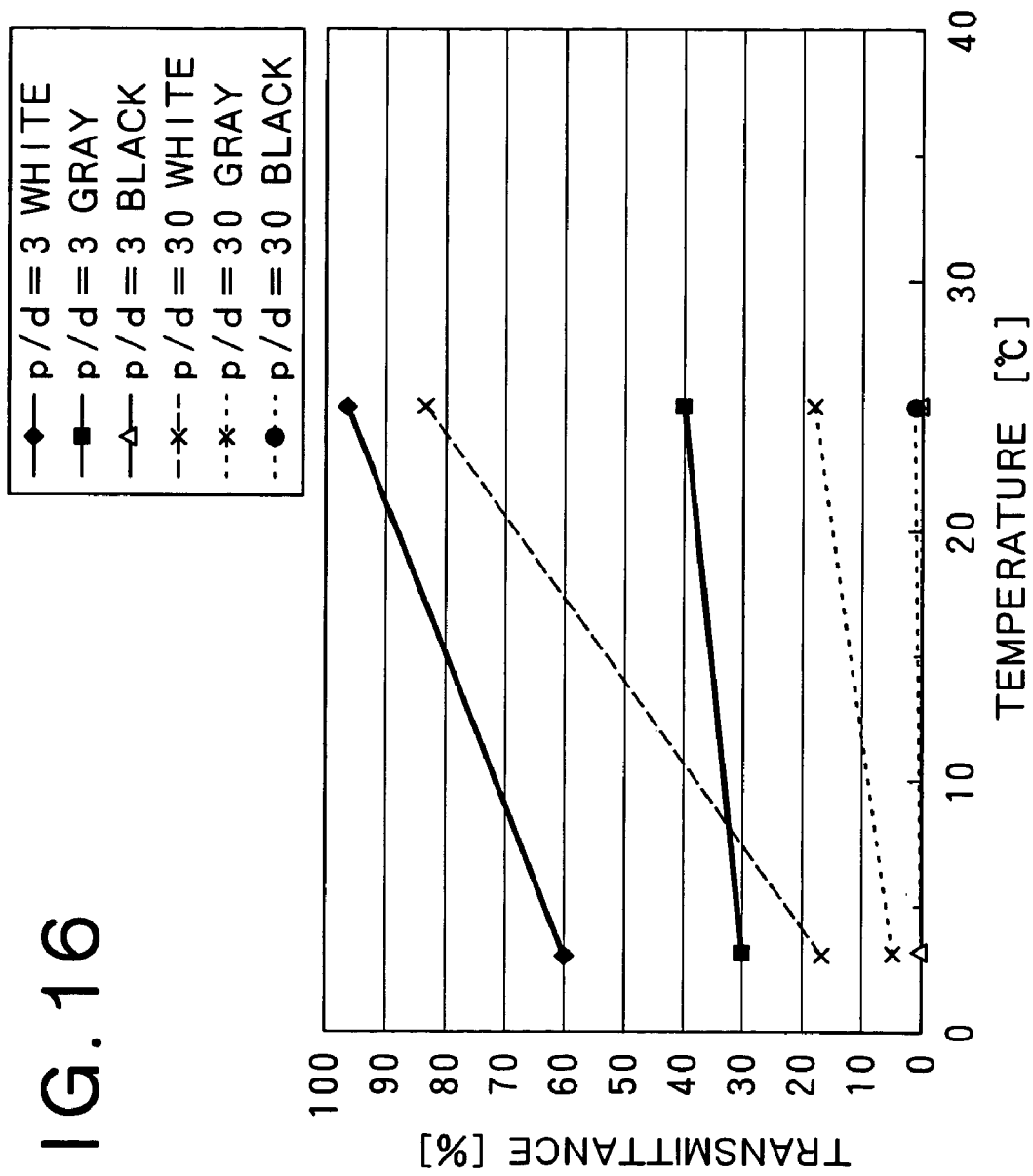
FIG. 16 is a graph showing an influence of the temperature to the transmittance of the liquid crystal, in which the lateral axis indicates the temperature and the longitudinal axis indicates the transmittance.

In addition, measurement results under various temperature conditions are shown below. Two types of liquid crystal materials, namely, one having the p/d value of 30 and one having the p/d value of 3 are used herein. As the temperature conditions, room temperature (25° C.) and low temperature (3° C.) are selected. Moreover, three display conditions of a white display, a black display, and a gray display are selected as the conditions at the room temperature. The result is shown in FIG. 16. In FIG. 16, the lateral axis indicates the temperature and the longitudinal axis indicates the transmittance. Under the condition where p/d=30, the transmittance for the white display is very little at the temperature of 3° C. On the contrary, under the condition where p/d=3, the transmittance is equal to or more than 60% at the temperature of 3° C. Accordingly, it is apparent that the present invention can also improve the temperature dependency of the response of the liquid crystal.

The improvement in the temperature dependency is deemed attributable to the following two effects. The first effect is the increase in the response of the liquid crystal. Accordingly, sufficient response speed is achieved at low temperature. The second effect is elimination of bounces. Accordingly, it is possible to prevent an unstable alignment state and to eliminate an influence of a previous frame. As a consequence, it is conceivable that a fine tone display is achieved even if environmental temperature is changed.

In addition, it has been already proved that the temperature dependency is also related to the structure of the twisted nematic liquid crystal material. It is obvious to those skilled in the art as to which type of the materials should be selected. It is particularly effective to form a composition from the viewpoints of: small temperature dependency of the twist pitch of the composition; a constant pitch substantially equivalent to the pitch at room temperature which is obtainable in a wider temperature range; or temperature dependency which exhibits a shorter pitch at lower temperature.

The reason of elimination of bounces is considered as follows. In the conventional method, liquid crystal molecules are fully excited when a high voltage is applied thereto. When the voltage is cut off in this state, the liquid crystal molecules try to lie down. However, the lying direction is not regulated when the molecules are fully excited. Accordingly, the alignment becomes unstable and a bounce takes place. Meanwhile, if the molecules are not fully excited, such an aspect is stored as a hysteresis which will cause an unstable display. On the contrary, according to the present invention, when a high voltage is applied, the effect of stabilization when no voltage is applied and the effect of excitation by the high voltage establish a certain equilibrium. In this way, the liquid crystal molecules are prevented from full excitation. As a consequence, the molecules always lie down in a certain direction when the voltage is cut off. Moreover, since the equilibrium is established by large torque, the liquid crystal molecules are always stabilized in almost the same state. Therefore, the fine resetting effect is always achieved without storing the hysteresis.

As described above, there are two types of twist alignment, namely, the normal twist alignment in which a twisting direction is in conformity to the twist pitch, and the reverse twist alignment in which a twisting direction corresponding to the twist pitch is different from a twisting direction in actual alignment. It is possible to increase the torque to recover the normal twist alignment by satisfying the relation defined as (the twist pitch/the thickness of the liquid crystal layer)<8. In this way, the present invention can prevent a defect attributable to the reverse twist alignment while increasing the response speed.

In addition to the electric fields between the pixel electrodes and the common electrode, the liquid crystal also generates electric fields due to wiring (such as scan lines) arranged in the outer periphery of the pixels. When a direction obtained by projecting a direction of the maximum electric field out of all electric fields occurring inside the liquid layer except the electric fields occurring between the pixel electrodes and the common electrode onto the substrate surface is substantially parallel to a direction obtained by projecting a direction of alignment of the liquid crystal in the center of the liquid crystal layer of the twisted nematic liquid crystal when no voltage is applied thereto onto the substrate surface, it is possible to increase the torque to recover the normal twist alignment (which is realized when no voltage is applied). By contraries, if these projecting directions are orthogonal to each other, the reverse twist alignment tends to occur frequently.

Furthermore, it is possible to stabilize the normal twist alignment by establishing certain conditions for angles of the alignment of the liquid crystal (such as a rising angle or pretilt angle) on the substrate surface. FIG. 17 is a graph showing a simulation result of an energy difference between the reverse twist alignment and the normal twist alignment with respect to a variable pretilt angle. The energy difference is increased along with an increase in the pretilt angle up to some 16 degrees. In other words, the normal twist alignment is more stable within this range along with the increase in the pretilt angle. However, the energy difference is reduced when the pretilt angle exceeds 16 degrees, and the reverse twist alignment becomes stable instead. Moreover, a torque difference for the response at decay time is obtained by an energy difference between a state when the alignment of the liquid crystal is raised by application of the voltage and a state of the alignment of the liquid crystal when no voltage is applied thereto. According to the simulation results, the energy difference is greater as the pretilt angle is smaller. Particularly, it is possible to achieve a significant energy difference when the pretilt angle is equal to or smaller than 5%.

In the meantime, an anchoring strength which indicates magnitude of an interaction between the substrate and the liquid crystal on the substrate surface causes an energy difference attributable to a difference in the pretilt angle of the liquid crystal. Accordingly, the magnitude of the torque varies as well. From the simulation results, it is found out that the normal twist alignment becomes suddenly unstable when the anchoring strength falls below $10^{-5}$ [J/m$^2$].

By performing the field sequential driving operation of the liquid crystal display device according to the present invention synchronously with the light sources, it is possible to realize a TN-TFT field sequential display device, which had been considered difficult.

In the present invention, it is to be noted that the twist angle does not have to be around 90 degrees. It is only essential that the liquid crystal has a twisted structure, and the twist angle thereof is not regulated in particular.

The present invention is capable of improving response of a transmissive display device, and is effective for use in electronic equipment associated with rapid motion images such as a television or a game player. In the present invention, the twist angle does not have to be around 90 degrees. It is only essential that the liquid crystal has a twisted structure, and the twist angle thereof is not regulated in particular.

What is claimed is:

1. A liquid crystal panel comprising:
    a transistor array substrate having pixel electrodes and thin film transistors for driving said pixel electrodes, said pixel electrodes and said thin film transistors being formed at a surface of said substrate;
    an opposite substrate provided so as to the opposite to said surface of said transistor array substrate and having a common electrode formed at a surface thereof which is opposed to said transistor array substrate; and
    a liquid crystal layer being disposed between said transistor array substrate and said opposite substrate, and being formed twisted nematic liquid crystal, wherein a relation defined as p/d<20 holds true in which p is a twist pitch of said twisted nematic liquid crystal and d is a thickness of said twisted nematic liquid crystal layer.

2. The liquid crystal panel according to claim 1, wherein a relation defined as p/d<8 is satisfied.

3. The liquid crystal panel according to claim 1, wherein said twisted nematic liquid crystal undergoes polymer stabilization.

4. The liquid crystal panel according to claim 3, wherein said polymer stabilization is achieved by adding a photocurable monomer to said twisted nematic liquid crystal and exposing the mixture to light.

5. The liquid crystal panel according to claim 4, wherein said photocurable monomer is a liquid crystalline monomer having a liquid crystalline framework.

6. The liquid crystal panel according to claim 5, wherein said liquid crystalline monomer is diacrylate.

7. The liquid crystal panel according to claim 5, wherein said liquid crystalline monomer is monoacrylate in which a polymerizable functional group is bonded to the liquid crystalline framework without interposition of a methylene spacer.

8. The liquid crystal panel according to claim 1, further comprising a drive circuit for driving said twisted nematic liquid crystal.

9. The liquid crystal panel according to claim 8, wherein said drive circuit is formed on said transistor array substrate.

10. The liquid crystal panel according to claim 9, wherein said drive circuit is an overdrive circuit.

11. The liquid crystal panel according to claim 8, wherein said drive circuit is a circuit for modulating a common voltage.

12. The liquid crystal panel according to claim 8, wherein a direction obtained by projecting a direction of a maximum electric field out of all electric fields occurring inside said liquid crystal layer except electric fields occurring between said pixel electrodes and said common electrode onto the substrate surface is parallel to a direction obtained by projecting a direction of alignment of the liquid crystal in the center of said liquid crystal layer when no voltage is applied to said liquid crystal layer, onto the substrate surface.

13. The liquid crystal panel according to claim 1, wherein a pretilt angle of said twisted nematic liquid crystal relative to the substrate surface is equal to, or smaller than, an angle for stabilizing reverse twist alignment.

14. The liquid crystal panel according to claim 13, wherein said pretilt angle is equal to or smaller than 16 degrees.

15. The liquid crystal display according to claim 14, said pretilt angle is equal to or smaller than 5 degrees.

16. The liquid crystal panel according to claim 1, wherein an anchoring strength in a direction of the pretilt angle of said twisted nematic liquid crystal on a surface of said liquid crystal layer which is in contact with at least one of said substrates is an anchoring strength which does not unstabilize the normal twist alignment.

17. The liquid crystal panel according to claim 16, wherein said anchoring strength is equal to, or larger than, $10^{-5}$ [J/m$^2$].

18. A liquid crystal display device comprising the liquid crystal panel according to claim 1.

19. The liquid crystal display device according to claim 18, wherein said liquid crystal panel is driven by a field sequential method.

20. The liquid crystal display device according to claim 19, further comprising:
    a light source disposed on a back side of said liquid crystal panel for sequentially emitting light in a plurality of colors;
    a splitter for splitting a piece of image data into a plurality of pieces of color image data respectively corresponding to said plurality of colors; and
    a synchronizer for synchronizing timings for said light source to emit said light in the plurality of colors with timings for said plurality of pieces of color image data to be outputted to said liquid crystal panel, wherein
    said liquid crystal panel is configured to display said plurality of pieces of color image data sequentially.

21. Electronic equipment comprising the liquid crystal display device according to claim 20.

22. Electronic equipment comprising the liquid crystal display device according to claim 19.

23. Electronic equipment comprising the liquid crystal display device according to claim 18.

* * * * *